US 12,428,240 B2

(12) United States Patent
Mizuno et al.

(10) Patent No.: US 12,428,240 B2
(45) Date of Patent: Sep. 30, 2025

(54) CONVEYANCE CONTROL DEVICE, CONVEYANCE CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventors: Kodai Mizuno, Hekinan (JP); Takeshi Watanabe, Nagoya (JP); Shuichi Tamaki, Nagoya (JP); Akira Shinoda, Obu (JP); Kenji Sato, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 699 days.

(21) Appl. No.: 17/845,427

(22) Filed: Jun. 21, 2022

(65) Prior Publication Data

US 2022/0315349 A1 Oct. 6, 2022

Related U.S. Application Data

(63) Continuation-in-part of application No. PCT/JP2020/047903, filed on Dec. 22, 2020.

(30) Foreign Application Priority Data

Dec. 25, 2019 (JP) ................. 2019-234068

(51) Int. Cl.
*B65G 43/10* (2006.01)
*B41J 2/21* (2006.01)
*B65G 37/02* (2006.01)

(52) U.S. Cl.
CPC ............ *B65G 43/10* (2013.01); *B41J 2/2114* (2013.01); *B65G 37/02* (2013.01); *B41J 2/2117* (2013.01); *B65G 2201/022* (2013.01)

(58) Field of Classification Search
CPC ...... B65G 43/10; B65G 37/02; B41J 2/16517; B41J 2/2117; B41J 2/2114; B41J 3/4078;
(Continued)

(56) References Cited

U.S. PATENT DOCUMENTS 7,008,128 B1 * 3/2006 Nakanishi ............ B41J 3/28
101/42
8,498,001 B2 * 7/2013 Zach .................... B41J 3/44
358/1.14
(Continued)

FOREIGN PATENT DOCUMENTS

CN 102189779 A 9/2011
CN 102271918 A 12/2011
(Continued)

OTHER PUBLICATIONS

International Preliminary Report on Patentability for corresponding PCT application PCT/JP2020/047903, dated Jun. 28, 2022.
(Continued)

*Primary Examiner* — Patrick H Mackey
(74) *Attorney, Agent, or Firm* — K&L Gates LLP

(57) ABSTRACT

A conveyance control device includes a processor and a memory. The processor is configured to control a conveyor. The conveyor is configured to convey a platen from a conveyance start position of the platen to one of a plurality of printers via a pretreatment device. The pretreatment device is configured to perform pretreatment on a recording medium placed on the platen. The conveyor is configured to convey the platen to one of a first lane including a first printer group formed of a plurality of the printers or a second lane including a second printer group formed of a plurality of the printers. The memory stores computer-readable instructions that instruct the processor to perform determination processing of determining whether to convey the (Continued)

platen to the first lane or to convey the platen to the second lane, based on the recording medium placed on the platen.

8 Claims, 16 Drawing Sheets

(58) Field of Classification Search
CPC .... B41J 3/543; B41J 11/0015; B41J 13/0009; B41J 11/06
See application file for complete search history.

(56) References Cited

U.S. PATENT DOCUMENTS

| | | | | |
|---|---|---|---|---|
| 8,882,261 | B2* | 11/2014 | Spence | B41J 11/06 347/104 |
| 11,443,153 | B2* | 9/2022 | Watanabe | B41J 3/4078 |
| 12,180,029 | B2* | 12/2024 | Kobayashi | B41J 11/06 |
| 2004/0179081 | A1 | 9/2004 | Niimi et al. | |
| 2005/0078137 | A1 | 4/2005 | Juan et al. | |
| 2009/0056582 | A1 | 3/2009 | Mizutani | |
| 2009/0097044 | A1 | 4/2009 | Zach | |
| 2009/0314201 | A1 | 12/2009 | Baccini | |
| 2011/0211006 | A1 | 9/2011 | Ochiai | |
| 2013/0293652 | A1* | 11/2013 | Spence | B65H 3/0816 271/225 |
| 2015/0077488 | A1* | 3/2015 | Mozel | B41M 5/0011 347/96 |
| 2015/0217563 | A1 | 8/2015 | Ikeda | |
| 2015/0273866 | A1 | 10/2015 | Sakai | |
| 2019/0299663 | A1 | 10/2019 | Takagiwa | |
| 2021/0198062 | A1* | 7/2021 | Mizuno | B41J 11/20 |
| 2021/0198063 | A1* | 7/2021 | Mizuno | B41J 3/543 |
| 2021/0303942 | A1* | 9/2021 | Watanabe | G06K 15/16 |
| 2022/0212462 | A1* | 7/2022 | Friedrich | B41J 11/002 |
| 2022/0315349 | A1* | 10/2022 | Mizuno | B41J 13/0009 |
| 2025/0021280 | A1* | 1/2025 | Morikawa | G06F 3/12 |

FOREIGN PATENT DOCUMENTS

| | | |
|---|---|---|
| CN | 103381713 A | 11/2013 |
| CN | 104210251 A | 12/2014 |
| CN | 104582976 A | 4/2015 |
| JP | H09240072 A | 9/1997 |
| JP | 2004276319 A | 10/2004 |
| JP | 2004291399 A | 10/2004 |
| JP | 2009051114 A | 3/2009 |
| JP | 2015183331 A | 10/2015 |

OTHER PUBLICATIONS

Written Opinion for corresponding PCT application PCT/JP2020/047903, dated Mar. 2, 2021. (3 pages.).
International Search Report of corresponding PCT application PCT/JP2020/047903, dated Mar. 2, 2021.
Extended European Search Report issued in related European Patent Application No. 20906984.8, dated Dec. 15, 2023. (10 pages.).
Office Action issued in related Chinese Patent Application No. 202080089725.6, dated Jan. 31, 2024. (11 pages.).

* cited by examiner

FIG. 8A

| PRINTER SPECIFICATION | | | |
|---|---|---|---|
| COLOR | COLOR | WHITE + COLOR | WHITE + COLOR + FEATURE COLOR |
| INK TYPE | INK FOR COTTON | INK FOR SYNTHETIC FIBERS | |
| COMPATIBLE PLATEN SIZE | SIZE L | SIZE M | SIZE S |
| COMPATIBLE PRINTING SIZE | W - X INCHES (W), Y - Z INCHES (H) | | |

| PRINTER SPECIFICATION ||
|---|---|
| COLOR | COLOR |
| INK TYPE | INK FOR SYNTHETIC FIBERS |
| COMPATIBLE PLATEN SIZE | SIZE L |
| COMPATIBLE PRINTING SIZE | X INCHES (W), Z INCHES (H) |

| STATE | PRIORITY | DETAILS OF STATE | SUPPLEMENTARY INFORMATION |
|---|---|---|---|
| PRINTING POSSIBLE | 1 | PRINTING POSSIBLE (NO PLATEN) | |
| | 2 | PRINTING IN PROGRESS (20 SECONDS OR LESS UNTIL PRINTING IS COMPLETE) | PRIORITY IS HIGHER THE SHORTER THE TIME PERIOD UNTIL START |
| | 3 | PRINTING IN PROGRESS (MORE THAN 20 SECONDS AND 40 SECONDS OR LESS UNTIL PRINTING IS COMPLETE) | |
| | 4 | PRINTING IN PROGRESS (10 SECONDS FOR CONVEYANCE AND MORE THAN 40 SECONDS AND 60 SECONDS OR LESS FOR PRINTING) | |
| | 5 | PRINTING IN PROGRESS (30 SECONDS FOR MAINTENANCE AND MORE THAN 40 SECONDS AND 60 SECONDS OR LESS FOR PRINTING) | |
| PRINTING NOT POSSIBLE | 6 | PERIODIC REPLACEMENT IN PROGRESS (INK REPLENISHMENT IN PROGRESS) | PERIODIC OPERATION |
| | 7 | PLATEN DISCHARGE IN PROGRESS | PERIODIC OPERATION |
| | 8 | PURGING IN PROGRESS | PERIODIC OPERATION |
| | × | POWER SOURCE OFF | IRREGULAR OPERATION |
| | × | MACHINE ERROR (SUCH AS INK EMPTY) | IRREGULAR OPERATION |
| | × | PRINTER COVER OPEN | IRREGULAR OPERATION |

FIG. 12A

| CONVEYANCE CONDITIONS TO PRINTER 3A | | | | |
|---|---|---|---|---|
| STANDBY POSITION | FIRST CONVEYANCE PATH | SECOND CONVEYANCE PATH (ENTER) | PRINTER 3A | SECOND CONVEYANCE PATH (EXIT) |
| - | × | × | × | × |
| THIRD CONVEYANCE PATH | FOURTH CONVEYANCE PATH (ENTER) | PRINTER 4A | FOURTH CONVEYANCE PATH (EXIT) | FIFTH CONVEYANCE PATH |
| Any | Any | Any | Any | Any |
| SIXTH CONVEYANCE PATH (ENTER) | PRINTER 5A | SIXTH CONVEYANCE PATH (EXIT) | SEVENTH CONVEYANCE PATH | |
| Any | Any | Any | Any | |

FIG. 12B

| CONVEYANCE CONDITIONS TO PRINTER 4A ||||| 
|---|---|---|---|---|
| STANDBY POSITION | FIRST CONVEYANCE PATH | SECOND CONVEYANCE PATH (ENTER) | PRINTER 3A | SECOND CONVEYANCE PATH (EXIT) |
| - | × | × | AFTER COMPLETION OF PRINTING : ×<br>PRINTING IN PROGRESS/ MAINTENANCE IN PROGRESS/OUT OF ORDER: GO | × |
| THIRD CONVEYANCE PATH | FOURTH CONVEYANCE PATH (ENTER) | PRINTER 4A | FOURTH CONVEYANCE PATH (EXIT) | FIFTH CONVEYANCE PATH |
| PLATEN TOWARD FOURTH CONVEYANCE PATH : ×<br>PLATEN TOWARD FIFTH CONVEYANCE PATH: GO | × | × | Any | Any |
| SIXTH CONVEYANCE PATH (ENTER) | PRINTER 5A | SIXTH CONVEYANCE PATH (EXIT) | SEVENTH CONVEYANCE PATH | |
| Any | Any | Any | Any | |

FIG. 12C

| CONVEYANCE CONDITIONS TO PRINTER 5A ||||||
|---|---|---|---|---|
| STANDBY POSITION | FIRST CONVEYANCE PATH | SECOND CONVEYANCE PATH (ENTER) | PRINTER 3A | SECOND CONVEYANCE PATH (EXIT) |
| - | × | Any | AFTER COMPLETION OF PRINTING: × PRINTING IN PROGRESS/ MAINTENANCE IN PROGRESS/OUT OF ORDER: GO | × |
| THIRD CONVEYANCE PATH | FOURTH CONVEYANCE PATH (ENTER) | PRINTER 4A | FOURTH CONVEYANCE PATH (EXIT) | FIFTH CONVEYANCE PATH |
| PLATEN TOWARD SIXTH CONVEYANCE PATH: × PLATEN TOWARD FOURTH AND SEVENTH CONVEYANCE PATHS: GO | Any | AFTER COMPLETION OF PRINTING: × PRINTING IN PROGRESS/ MAINTENANCE IN PROGRESS/OUT OF ORDER: GO | Any | PLATEN TOWARD SIXTH CONVEYANCE PATH: × PLATEN TOWARD SEVENTH CONVEYANCE PATH: GO |
| SIXTH CONVEYANCE PATH (ENTER) | PRINTER 5A | SIXTH CONVEYANCE PATH (EXIT) | SEVENTH CONVEYANCE PATH | |
| × | × | Any | Any | |

CONVEYANCE CONTROL DEVICE, CONVEYANCE CONTROL METHOD, AND NON-TRANSITORY COMPUTER-READABLE MEDIUM STORING COMPUTER-READABLE INSTRUCTIONS

CROSS-REFERENCE TO RELATED APPLICATION

This application is a continuation-in-part of International Application PCT/JP2020/047903, filed Dec. 22, 2020, which claims priority from Japanese Patent Application No. 2019-234068, filed on Dec. 25, 2019. The disclosure of the foregoing application is hereby incorporated by reference in its entirety.

BACKGROUND

The present disclosure relates to a conveyance control device, a conveyance control method, and a non-transitory computer-readable medium storing computer-readable instructions.

A print device is provided with a pretreatment agent application portion and a print portion. The pretreatment agent application portion applies a pretreatment agent onto a recording medium placed on a platen. The platen is conveyed by a movement mechanism from the pretreatment agent application portion to the print portion, and the print portion performs printing by applying a printing liquid onto the recording medium to which the pretreatment agent has been applied.

SUMMARY

In order to increase the number of a print processing in a certain period, it is conceivable to provide a print system that is provided with a plurality of printers. In the print system, it is conceivable to provide a conveyance portion that can convey the platen to a set position, at which the recording medium is set on the platen, to a pretreatment device, and to any one of the plurality of printers. In the print system, when the platen is conveyed to a specific printer only, this is not desirable from a viewpoint of increasing the number of the print processing in the certain period.

Embodiments of the broad principles derived herein provide a conveyance control device, a conveyance control method, and a non-transitory computer-readable medium storing computer-readable instructions capable of increasing the number of a print processing in a certain period.

A first aspect of the present disclosure relates to a conveyance control device including a processor and a memory. The processor is configured to control a conveyor. The conveyor is configured to convey a platen from a conveyance start position of the platen to one of a plurality of printers via a pretreatment device configured to perform pretreatment on a recording medium placed on the platen. The conveyor is configured to convey the platen to one of a first lane including a first printer group formed of a plurality of the printers or a second lane including a second printer group formed of a plurality of the printers. The memory stores computer-readable instructions that, when executed by the processor, instruct the processor to perform a process. The process includes performing determination processing of determining to which of the plurality of printers the platen is to be conveyed, the determination step including determining whether to convey the platen to the first lane or to convey the platen to the second lane, based on the recording medium placed on the platen.

The processor determines whether to convey the platen to the first lane or the second lane based on the recording medium placed on the platen, and thus, the platen is conveyed to the lane provided with the printer suited to the recording medium. As a result, the number of a print processing can be increased in a certain period.

A second aspect of the present disclosure relates to a conveyance control method in which a computer controls a conveyor. The conveyor is configured to convey a platen from a conveyance start position of the platen to one of a plurality of printers via a pretreatment device configured to perform pretreatment on a recording medium placed on the platen. The conveyor is configured to convey the platen to one of a first lane including a first printer group formed of a plurality of the printers or a second lane including a second printer group formed of a plurality of the printers. The conveyance control method includes performing determination processing of determining whether to convey the platen to the first lane or to convey the platen to the second lane, based on the recording medium placed on the platen.

A third aspect of the present disclosure relates to a non-transitory computer-readable medium storing computer-readable instructions that, when executed by a computer configured to control a conveyor causes the computer to perform a process. The conveyor is configured to convey a platen from a conveyance start position of the platen to one of a plurality of printers via a pretreatment device performing pretreatment on a recording medium placed on the platen. The conveyor is configured to convey the platen to one of a first lane including a first printer group formed of a plurality of the printers or a second lane including a second printer group formed of a plurality of the printers. The process includes performing determination processing of determining whether to convey the platen to the first lane or to convey the platen to the second lane, based on the recording medium placed on the platen.

BRIEF DESCRIPTION OF THE DRAWINGS

Embodiments will be described below in detail with reference to the accompanying drawings in which:

FIG. 8A is printer specifications;
FIG. 8C is printer specifications;
FIG. 9 is a priority table;
FIG. 12A is tables of conveyance conditions of the printers;
FIG. 12B is tables of conveyance conditions of the printers;
and FIG. 12C is tables of conveyance conditions of the printers.

DETAILED DESCRIPTION

Figure 1:
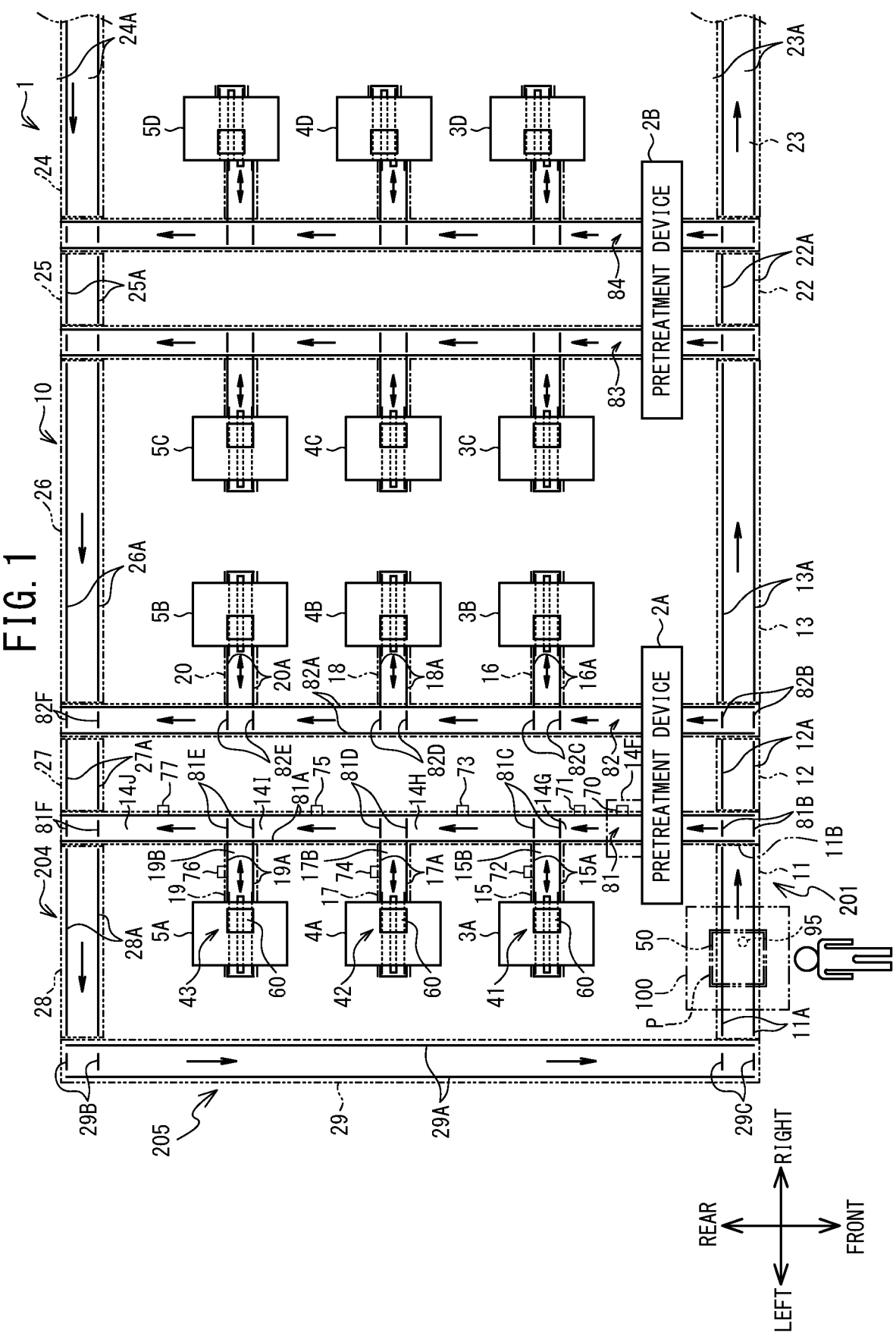
FIG. 1 is a plan view of a print system.

An embodiment of the present disclosure will be explained. Left and right, front and rear, and up and down directions shown by arrows in the drawings are used in the following explanation. A print system 1 shown in FIG. 1 is a system that can sequentially perform pretreatment and print processing on a recording medium placed on a platen 50 while conveying the platen 50. The recording medium is a cloth, such as a T-shirt or the like. The material of the cloth is cotton, polyester, a mixture of cotton and polyester, or the like.

The configuration of the print system 1 will be described with reference to FIG. 1. The print system 1 is provided with a platen conveyance mechanism 10, pretreatment devices 2A and 2B, printers 3A to 3D, 4A to 4D, and 5A to 5D, a code reader 95, and the like. The platen conveyance mechanism 10 is provided with a first lane 81, a second lane 82, a third lane 83, and a fourth lane 84. The first lane 81 to the fourth lane 84 respectively extend in the front-rear direction in parallel to each other, and convey the platen 50. The pretreatment device 2A is disposed to the front of the first lane 81 and the second lane 82, and performs the pretreatment on a cloth P placed on the platen 50. The pretreatment device 2B is disposed to the front of the third lane 83 and the fourth lane 84, and performs the pretreatment on the cloth P placed on the platen 50.

For example, each of the pretreatment devices 2A and 2B is provided with an application portion and a heat treatment portion that are not shown in the drawings. The application portion sprays a pretreatment agent using a spray, and applies a pretreatment agent onto the cloth P placed on the platen 50. The pretreatment agent is a base coat agent that is applied before ink is applied onto the cloth P, which is an example of a recording medium. The pretreatment agent is a liquid to form a film between fibers of the cloth so that the ink is fixed on the cloth P more effectively, and contains resin components, for example. The pretreatment agent contains, for example, a divalent metal salt (such as $CaCl_2$, $Ca(NO_2)_2$, or the like), and enhances color development of the ink. For example, the heat treatment portion is a heat press portion, which dries the pretreatment agent by pressurizing the cloth P at a high temperature. Thus, fixation of the pretreatment agent on the cloth P is improved, and image quality is improved. The heat press portion of the pretreatment device 2A, for example, performs a heat press operation at a temperature (110° C., for example) for synthetic fibers. The heat press portion of the pretreatment device 2B, for example, performs the heat press operation at a temperature (180° C., for example) for cotton.

In the first lane 81, the printers 3A, 4A, and 5A are aligned in the front-rear direction to the rear of the pretreatment device 2A. In the second lane 82, the printers 3B, 4B, and 5B are aligned in the front-rear direction to the rear of the pretreatment device 2A. In the third lane 83, the printers 3C, 4C, and 5C are aligned in the front-rear direction to the rear of the pretreatment device 2B. In the fourth lane 84, the printers 3D, 4D, and 5D are aligned in the front-rear direction to the rear of the pretreatment device 2B. The printers 3A to 5D are inkjet printers that perform printing by ejecting ink from nozzles of a print head onto the cloth P, placed on the platen 50, on which the pretreatment has been performed.

The printers 3A to 3D eject seven types of ink (white (W), black (K), yellow (Y), cyan (C), magenta (M), green (G), and red (R)). Green (G) and red (R) are described below as feature colors. But the ink of the feature color is not limited to this example, and may be fluorescent ink or the like. The printers 4A to 4D eject five types of the ink (white (W), black (K), yellow (Y), cyan (C), and magenta (M)). The printers 5A to 5D eject four types of the ink (black (K), yellow (Y), cyan (C), and magenta (M)). Further, each of the inks of the printers 3A, 3B, 4A, 4B, 5A, and 5B are inks for synthetic fibers. Each of the inks of the printers 3C, 3D, 4C, 4D, 5C, and 5D are inks for cotton. Further, the printers 3A, 4A, 5A, 3C, 4C, and 5C are printers compatible with the large sized (L) platen 50. In addition, the printers 3B, 4B, 5B, 3D, 4D, and 5D are printers compatible with the standard sized platen 50.

The platen conveyance mechanism 10 conveys the platen 50 installed at a preparation position 100 (to be described later) to one of the first lane 81 to the fourth lane 84 from the preparation position 100 that is a conveyance start position of the platen 50, causes the platen 50 to pass through the pretreatment device 2A or the pretreatment device 2B, causes the printing to be performed at one of the printers 3A to 5D, and returns the platen 50 to the preparation position 100 once more.

The code reader 95 provided at the preparation position 100 to be described below reads an identification information portion (not shown in the drawings) provided on the cloth P, and inputs identification information to a CPU 101 (to be described later) of the print system 1. The identification information is information to identify the cloth P, and is, for example, information of a one-dimensional code, such as a bar code, a two-dimensional code, such as a QR code (registered trademark), or a three-dimensional code. The identification information includes information of a type, color and size of the cloth P, a print color, a printing size, and the like.

The configuration of the platen conveyance mechanism 10 will be explained with reference to FIG. 1. The platen conveyance mechanism 10 is provided with a dispatch line 201, the first lane 81, the second lane 82, the third lane 83, the fourth lane 84, a first return line 204, and a second return line 205. The dispatch line 201 is positioned at the forefront of the print system 1 and extends linearly in the left-right direction, and is used to convey the platen 50 toward the first lane 81 to the fourth lane 84. The dispatch line 201 is provided with conveyance mechanisms 11, 12, 13, 22, and 23, in that order from the left. The conveyance mechanisms 11, 12, 13, 22, and 23 respectively extend in the left-right direction, and convey the platen 50 to the right. The conveyance mechanism 11 is provided at the preparation position 100. The preparation position 100 is a position at which the cloth P is set on the platen 50. The conveyance mechanisms 11, 12, 13, 22, and 23 convey the platen 50 to the right. The first return line 204 is positioned at the rearmost of the print system 1 and extends in the left-right direction. The first return line 204 is provided with conveyance mechanisms 28, 27, 26, 25, and 24 in that order from the left. Each of the conveyance mechanisms 28, 27, 26, 25, and 24 extends in the left-right direction, and conveys the platen 50 to the left.

The front end portion of the first lane 81 is positioned between the conveyance mechanism 11 and the conveyance mechanism 12. The front end portion of the second lane 82 is positioned between the conveyance mechanism 12 and the conveyance mechanism 13. The front end portion of the third lane 83 is positioned between the conveyance mechanism 13 and the conveyance mechanism 22. The front end portion of the fourth lane 84 is positioned between the conveyance mechanism 22 and the conveyance mechanism 23. Another lane may be further connected to the right-end of the conveyance mechanism 23.

The first lane 81 extends in the front-rear direction between the dispatch line 201 and the first return line 204 to be described later. The first lane 81 conveys the platen 50 received from the dispatch line 201 to the pretreatment device 2A. The pretreatment device 2A performs the pretreatment on the cloth P attached to the platen 50. The first lane 81 conveys the platen 50 after the pretreatment to one of the printers 3A to 5A, and transfers the platen 50 to the first return line 204. The second lane 82 extends in the front-rear direction between the dispatch line 201 and the first return line 204. The second lane 82 conveys the platen 50 received from the dispatch line 201 to the pretreatment device 2A. The pretreatment device 2A performs the pretreatment on the cloth P attached to the platen 50. The second lane 82 conveys the platen 50 after the pretreatment to one of the printers 3B to 5B, and transfers the platen 50 to the first return line 204. The third lane 83 extends in the front-rear direction between the dispatch line 201 and the first return line 204. The third lane 83 conveys the platen 50 received from the dispatch line 201 to the pretreatment device 2B. The pretreatment device 2B performs the pretreatment on the cloth P attached to the platen 50. The third lane 83 conveys the platen 50 after the pretreatment to one of the printers 3C to 5C, and transfers the platen 50 to the first return line 204. The fourth lane 84 extends in the front-rear direction between the dispatch line 201 and the first return line 204. The fourth lane 84 conveys the platen 50 received from the dispatch line 201 to the pretreatment device 2B. The pretreatment device 2B performs the pretreatment on the cloth P attached to the platen 50. The fourth lane 84 conveys the platen 50 after the pretreatment to one of the printers 3D to 5D, and transfers the platen 50 to the first return line 204.

The first lane 81 is provided with conveyance mechanisms 15, 17, and 19, and with print conveyance mechanisms 41 to 43. The first lane 81 extends to the rear from the right end of the conveyance mechanism 11, passes through the interior of the pretreatment device 2A, and further extends to the rear. The first lane 81 receives the platen 50 from the conveyance mechanism 11, passes through the pretreatment device 2A, and conveys the platen 50 to the rear. The conveyance mechanism 15 is positioned at the rear of the pretreatment device 2A, and extends to the left from the first lane 81 toward the printer 3A. The conveyance mechanism 15 receives the platen 50 from the first lane 81 and conveys the platen 50 toward the printer 3A. The conveyance mechanism 15 conveys the platen 50 on which the printing by the printer 3A is complete to the right, and delivers the platen 50 to the first lane 81.

The conveyance mechanism 17 extends to the left from the first lane 81 toward the printer 4A, to the rear of the conveyance mechanism 15. The conveyance mechanism 17 receives the platen 50 from the first lane 81, and conveys the platen 50 toward the printer 4A. The conveyance mechanism 17 conveys the platen 50 on which the printing by the printer 4A is complete to the right, and delivers the platen 50 to the first lane 81. The conveyance mechanism 19 is positioned at the rear of the conveyance mechanism 17, and extends to the left from the first lane 81 toward the printer 5A. The conveyance mechanism 19 receives the platen 50 from the first lane 81, and conveys the platen 50 toward the printer 5A. The conveyance mechanism 19 conveys the platen 50 on which the printing by the printer 5A is complete to the right, and delivers the platen 50 to the first lane 81.

The print conveyance mechanism 41 is provided at the printer 3A, and can convey the platen 50 in the left-right direction. The print conveyance mechanism 41 is provided with a platen support member 60, and a conveyance motor 137 (refer to FIG. 3). The platen support member 60 supports the platen 50 received from the conveyance mechanism 15. The conveyance motor 137 conveys the platen support member 60 in the left-right direction. The print conveyance mechanism 42 is provided at the printer 4A and the print conveyance mechanism 43 is provided at the printer 5A. The print conveyance mechanisms 42 and 43 have the same configuration as the print conveyance mechanism 41 and a description thereof will be omitted.

The conveyance mechanisms 12, 13, and 22 of the dispatch line 201 can respectively convey the platen 50 toward the second lane 82 to the fourth lane 84. The second lane 82 has a configuration that is left-right symmetrical with the first lane 81. Further, the third lane 83 has the same configuration as the first lane 81. The fourth lane 84 has the same configuration as the second lane 82. The conveyance mechanisms 27, 26, and 25 of the first return line 204 can convey, to the left, the platen 50 respectively received from the second lane 82 to the fourth lane 84.

A belt configuration of the platen conveyance mechanism 10 will be explained with reference to FIG. 1. First, the belt configuration of the dispatch line 201 will be described. The conveyance mechanism 11 is provided with a pair of lateral belts 11A. The lateral belts 11A are provided at both end portions of the conveyance mechanism 11 in a direction orthogonal to a conveyance direction, and can convey the platen 50 to the right.

The first lane 81 is provided with a pair of longitudinal belts 81A and pairs of lateral raising/lowering belts 81B to 81F. The pair of longitudinal belts 81A are provided at both end portions of the first lane 81 in the direction orthogonal to the conveyance direction. The pair of longitudinal belts 81A convey the platen 50 to the rear. The pairs of lateral raising/lowering belts 81B to 81F are disposed between the pair of longitudinal belts 81A. The pair of lateral raising/lowering belts 81B are provided at the front end portion of the first lane 81 such that they can be raised and lowered. The pair of lateral raising/lowering belts 81B convey the platen 50 to the right. The pair of lateral raising/lowering belts 81C are provided on the right of the conveyance mechanism 15 such that they can be raised and lowered. The pair of lateral raising/lowering belts 81D are provided on the right of the conveyance mechanism 17 such that they can be raised and lowered. The pair of lateral raising/lowering belts 81E are provided on the right of the conveyance mechanism 19 such that they can be raised and lowered. The pairs of lateral raising/lowering belts 81C to 81E convey the platen 50 to the left. The pair of lateral raising/lowering belts 81F are provided at the rear end portion of first lane 81 such that they can be raised and lowered. The pair of lateral raising/lowering belts 81F convey the platen 50 to the left.

The conveyance mechanisms 15, 17, and 19 are provided with pairs of lateral conveyance belts 15A, 17A and 19A. The pairs of lateral conveyance belts 15A, 17A, and 19A are provided, at both end portions of the conveyance mechanisms 15 to 19 in the direction orthogonal to the conveyance direction such that they can be raised and lowered.

The conveyance mechanisms 24, 25, 26, 27, and 28 are respectively provided with pairs of lateral belts 24A, 25A, 26A, 27A, and 28A that extend in the conveyance direction, and convey the platen 50 in the conveyance direction (to the left) of each of the conveyance mechanisms 24, 25, 26, 27, and 28. A conveyance mechanism 29 is provided with a pair of longitudinal belts 29A, and pairs of lateral raising/lowering belts 29B and 29C. The pair of longitudinal belts 29A are provided at both end portions of the conveyance mechanism 29 in the direction orthogonal to a conveyance direction. The pair of longitudinal belts 29A convey the platen 50 to the front. The pairs of lateral raising/lowering belts 29B and 29C are disposed between the pair of longitudinal belts 29A, and can be respectively raised and lowered to the left of the conveyance mechanisms 28 and 11. The pair of lateral raising/lowering belts 29B convey the platen 50 to the left, and the pair of lateral raising/lowering belts 29C convey the platen 50 to the right.

The second lane 82 is provided with conveyance mechanisms 16, 18, and 20. The conveyance mechanisms 16, 18, and 20 are provided with pairs of lateral conveyance belts 16A, 18A, and 20A. The pairs of lateral conveyance belts 16A, 18A, and 20A are provided at both end portions of the conveyance mechanisms 16, 18, and 20 in the direction orthogonal to a conveyance direction, such that they can be raised and lowered. The conveyance mechanisms 16, 18, and 20 have the same configuration as the conveyance mechanisms 15, 17, and 29. The second lane 82 receives the platen 50 from the conveyance mechanism 12, and conveys the platen 50 to the rear while passing through the pretreatment device 2A.

The conveyance mechanism 16 extends to the right from the second lane 82 toward the printer 3B, to the rear of the pretreatment device 2A. The conveyance mechanism 16 receives the platen 50 from the second lane 82, and conveys the platen 50 toward the printer 3B. The conveyance mechanism 16 conveys the platen 50 on which the printing by the printer 3B is complete to the left, and delivers the platen 50 to the second lane 82. The conveyance mechanism 18 is positioned at the rear of the conveyance mechanism 16, and extends to the right from the second lane 82 toward the printer 4B. The conveyance mechanism 18 receives the platen 50 from the second lane 82, and conveys the platen 50 toward the printer 4B. The conveyance mechanism 18 conveys the platen 50 on which the printing by the printer 4B is complete to the left, and delivers the platen 50 to the second lane 82. The conveyance mechanism 20 is positioned at the rear of the conveyance mechanism 18, and extends to the right from the second lane 82 toward the printer 5B. The conveyance mechanism 20 receives the platen 50 from the second lane 82, and conveys the platen 50 toward the printer 5B. The conveyance mechanism 20 conveys the platen 50 on which the printing by the printer 5B is complete to the left, and delivers the platen 50 to the second lane 82.

The second lane 82 is provided with a pair of longitudinal belts 82A and pairs of lateral raising/lowering belts 82B to 82F. The pair of longitudinal belts 82A are provided at both end portions of the second lane 82 in the direction orthogonal to the conveyance direction. The pair of longitudinal belts 82A convey the platen 50 to the rear. The pairs of lateral raising/lowering belts 82B to 82F are disposed between the pair of longitudinal belts 82A. The pair of lateral raising/lowering belts 82B are provided at the front end portion of the second lane 82 such that they can be raised and lowered. The pair of lateral raising/lowering belts 82B convey the platen 50 to the right. The pair of lateral raising/lowering belts 82C are provided on the left of the conveyance mechanism 16 such that they can be raised and lowered. The pair of lateral raising/lowering belts 82D are provided on the left of the conveyance mechanism 18 such that they can be raised and lowered. The pair of lateral raising/lowering belts 82E are provided on the left of the conveyance mechanism 20 such that they can be raised and lowered. The pairs of lateral raising/lowering belts 82C to 82E convey the platen 50 in the left-right direction. The pair of lateral raising/lowering belts 82F are provided at the rear end portion of the second lane 82 such that they can be raised and lowered. The pair of lateral raising/lowering belts 82F convey the platen 50 to the left. Note that the belt configuration of the third lane 83 is the same structure as the belt configuration of the first lane 81, and the belt configuration of the fourth lane 84 is the same structure as the belt configuration of the second lane 82, and an explanation thereof is thus omitted here.

Figure 3:
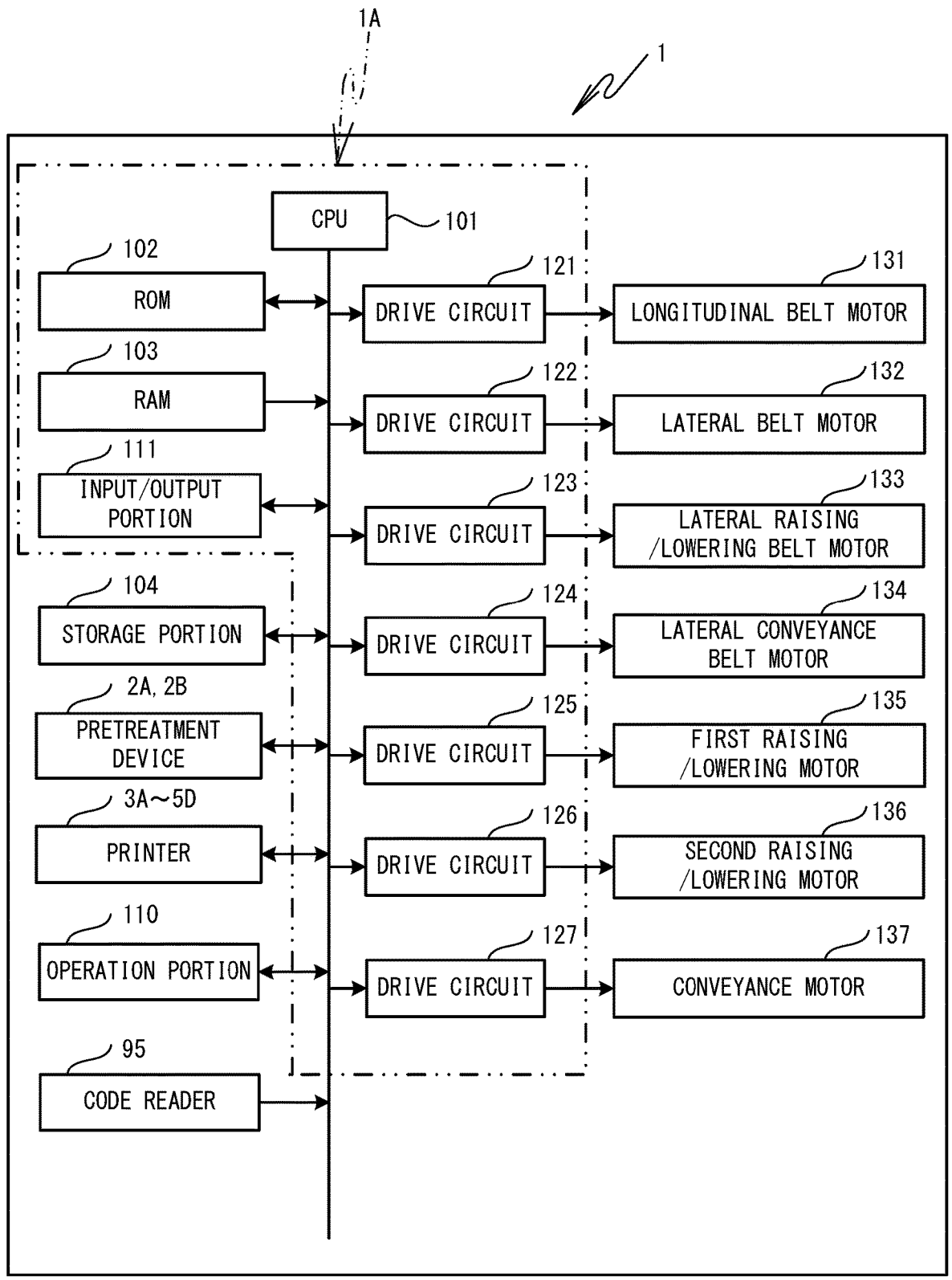
FIG. 3 is a block diagram showing an electrical configuration of the print system.

As shown in FIG. 3, the platen conveyance mechanism 10 is provided with a longitudinal belt motor 131, a lateral belt motor 132, a lateral raising/lowering belt motor 133, a lateral conveyance belt motor 134, a first raising/lowering motor 135, a second raising/lowering motor 136, the conveyance motor 137, and the like. The longitudinal belt motor 131 is provided so as to correspond to each of the longitudinal belts 29A, 81A, and 82A, and drives each of the belts. The lateral belt motor 132 is provided so as to correspond to each of the lateral belts 11A, 12A, 13A, 22A, 23A, 24A, 25A, 26A, 27A and 28A, and drives each of the belts. The lateral raising/lowering belt motor 133 is provided so as to correspond to each of the lateral raising/lowering belts 81B to 81F, and 82B to 82F, and drives each of the belts. The lateral conveyance belt motor 134 is provided so as to correspond to each of the lateral conveyance belts 15A to 20A, and drives each of the belts. The first raising/lowering motor 135 is provided so as to correspond to each of the lateral raising/lowering belts 81B to 81F, and 82B to 82F, and raises and lowers each of the belts. The second raising/lowering motor 136 is provided so as to correspond to each of the lateral conveyance belts 15A to 20A, and raises and lowers each of the belts. Note that the third lane 83 and the fourth lane 84 also have the same structure.

As shown in FIG. 1, a standby position 14F is provided at an outlet of the pretreatment device 2A of the first lane 81. The platen 50 on which the pretreatment is complete stands by at the standby position 14F until the platen 50 is conveyed to one of the printers 3A to 5A. In the following description, of the first lane 81, a section from the standby position 14F to the lateral raising/lowering belts 81C will be referred to as a first conveyance path 14G. Of the conveyance mechanism 15, a section from the left side of the lateral raising/lowering belts 81C to the end portion on the right of the printer 3A will be referred to as a second conveyance path 15B. Of the first lane 81, a section from the rear side of the lateral raising/lowering belts 81C to the lateral raising/lowering belts 81D will be referred to as a third conveyance path 14H. Of the conveyance mechanism 17, a section from the left side of the lateral raising/lowering belts 81D to the end portion on the right of the printer 4A will be referred to as a fourth conveyance path 17B. Of the first lane 81, a section from the rear side of the lateral raising/lowering belts 81D to the lateral raising/lowering belts 81E will be referred to as a fifth conveyance path 14I. Of the conveyance mechanism 19, a section from the left side of the lateral raising/lowering belts 81E to the end portion on the right of the printer 5A will be referred to as a sixth conveyance path 19B. Of the first lane 81, a remaining section from the rear side of the lateral raising/lowering belts 81E to the lateral raising/lowering belts 81F will be referred to as a seventh conveyance path 14J. Proximity sensors 70 to 77 are provided at each of the standby position 14F, the first conveyance path 14G, the second conveyance path 15B, the third conveyance path 14H, the fourth conveyance path 17B, the fifth conveyance path 14I, the sixth conveyance path 19B, and the seventh conveyance path 14J. The proximity sensors 70 to 77 detect the platen 50. Note that the second lane 82 to the fourth lane 84 are provided in a similar manner with a standby position and proximity sensors that are not shown in the drawings.

Platen Conveyance Operation

An example of a platen conveyance operation by the platen conveyance mechanism 10 will be described with reference to FIG. 1. Sensors that are not shown in the drawings are provided at position of each of the lateral raising/lowering belts, and detect the presence or absence of the platen 50. The CPU 101 controls the driving and the raising and lowering of each of the belts on the basis of outputs from these sensors. In the present example, an operation will be described when the platen 50 is conveyed to the dispatch line 201, the first lane 81, the printer 3A, the first return line 204, and the second return line 205, in that order.

When the conveyance of the platen 50 from the preparation position 100 is instructed, the lateral belts 11A are driven and the platen 50 is conveyed to the right. At this time, the lateral raising/lowering belts 81B are raised and disposed at the same height position as the lateral belts 11A, and the platen 50 is transferred from the lateral belts 11A to the lateral raising/lowering belts 81B. After that, the driving of the lateral raising/lowering belts 81B is stopped, and the lateral raising/lowering belts 81B are lowered. At the same time, the longitudinal belts 81A of the first lane 81 are driven. The lateral raising/lowering belts 81B are lowered to be lower than the longitudinal belts 81A, and thus, the platen 50 is placed on the longitudinal belts 81A, and is conveyed to the rear. The platen 50 is conveyed to the pretreatment device 2A and the pretreatment is performed on the cloth P. After that, the platen 50 is conveyed further to the rear and stands by at the standby position 14F.

When the platen 50 is conveyed to the printer 3A, when the platen 50 reaches a position above the lateral raising/lowering belts 81C, the driving of the longitudinal belts 81A is stopped, and the raising of the lateral raising/lowering belts 81C is started. The lateral raising/lowering belts 81C are raised to be higher than the longitudinal belts 81A, and are stopped at the same height position as the lateral conveyance belts 15A. The lateral conveyance belts 15A and the lateral raising/lowering belts 81C are driven, and the platen 50 is transferred from the lateral raising/lowering belts 81C to the lateral conveyance belts 15A. The lateral conveyance belts 15A are driven, and the platen 50 is conveyed toward the printer 3A. The platen 50 is transferred from the lateral conveyance belts 15A to the platen support member 60 (to be described later) provided inside the printer 3A. When the platen 50 is conveyed to the printer 4A, when the platen 50 reaches a position above the lateral raising/lowering belts 81D, the driving of the longitudinal belts 81A is stopped, and the raising of the lateral raising/lowering belts 81D is started. The lateral raising/lowering belts 81D are raised to be higher than the longitudinal belts 81A, and are stopped at the same height position as the lateral conveyance belts 17A. The lateral conveyance belts 17A and the lateral raising/lowering belts 81D are driven, and the platen 50 is transferred from the lateral raising/lowering belts 81D to the lateral conveyance belts 17A. Further, when the platen 50 is conveyed to the printer 5A, when the platen 50 reaches a position above the lateral raising/lowering belts 81E, the driving of the longitudinal belts 81A is stopped, and the raising of the lateral raising/lowering belts 81E is started.

The lateral raising/lowering belts 81E are raised to be higher than the longitudinal belts 81A, and are stopped at the same height position as the lateral conveyance belts 19A. The lateral conveyance belts 19A and the lateral raising/lowering belts 81E are driven, and the platen 50 is transferred from the lateral raising/lowering belts 81E to the lateral conveyance belts 19A.

When the platen 50 is conveyed to the printer 3A, the platen 50 is supported by the platen support member 60, is conveyed to the left, passes through the interior of the printer 3A, and is stopped at a left end position. When the printing is complete, the platen 50 is conveyed by the platen support member 60 to the right, and is transferred to the lateral conveyance belts 15A. The lateral conveyance belts 15A are driven in the rightward direction, and convey the platen 50 to the right. The lateral raising/lowering belts 81C are driven in the rightward direction, and the platen 50 is transferred from the lateral conveyance belts 15A to the lateral raising/lowering belts 81C. The driving of the lateral raising/lowering belts 81C in the rightward direction is stopped, the lateral raising/lowering belts 81C are lowered, and the platen 50 is placed on the longitudinal belts 81A. Next, the longitudinal belts 81A convey the platen 50 toward the lateral raising/lowering belts 81F.

After that, although not explained in detail, transfer operations are performed in the same manner as described above, and the platen 50 is transferred in order from the first lane 81 to the first return line 204, and from the first return line 204 to the second return line 205. Then, the platen 50 is transferred to the conveyance mechanism 11 of the dispatch line 201, and returns to the preparation position 100. In a similar manner, the platen 50 may be transferred to one of the second lane 82, the third lane 83, or the fourth lane 84, and the printing may be performed by one of the printers 3B to 3D. After that, the same operations apply to when the platen 50 is transferred in order to the first return line 204, and from the first return line 204 to the second return line 205, is transferred to the conveyance mechanism 11 of the dispatch line 201, and returns to the preparation position 100.

Figure 2:
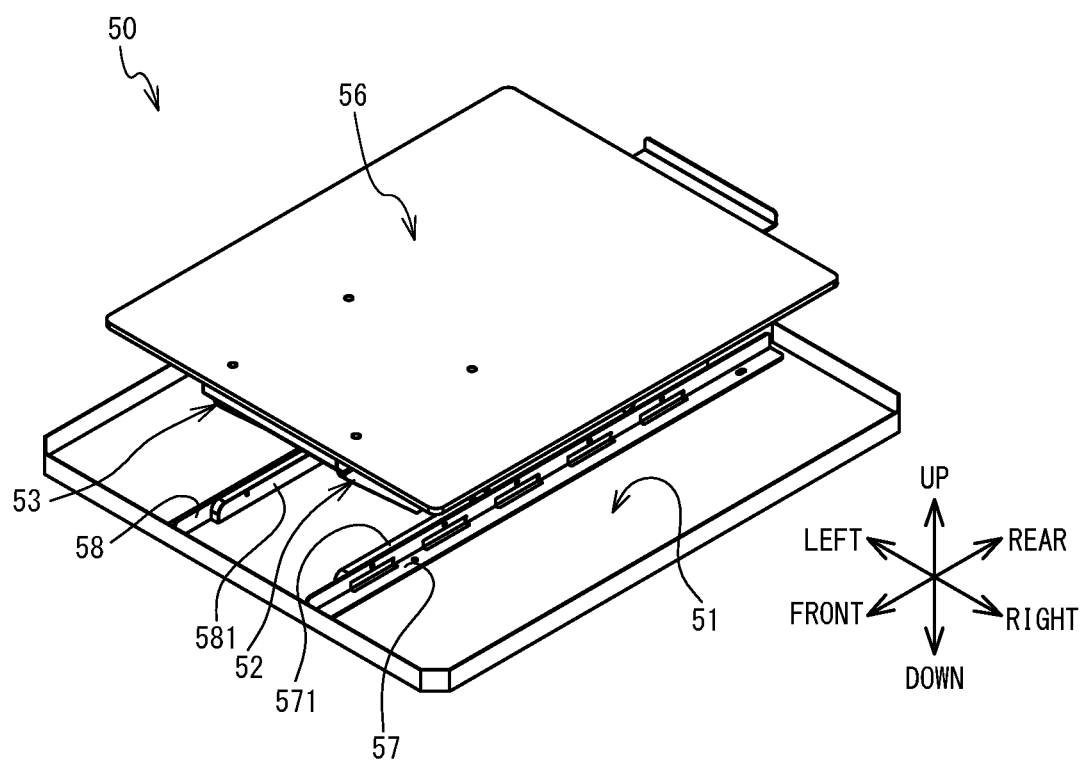
FIG. 2 is a perspective view of a platen.

The structure of the platen 50 will be described with reference to FIG. 2. The platen 50 is provided with a seat 51, a right side face plate 52, a left side face plate 53, a lower plate (not shown in the drawings), an upper plate (not shown in the drawings), and an attachment plate 56. The seat 51 is formed in a rectangular shape in a plan view. At a substantially central portion in the left-right direction of the upper surface of the seat 51, a pair of support members that are L-shaped in a cross-section and that extend in the front-rear direction (not shown in the drawings) are fixed at positions that are separated from each other in the left-right direction. The right side face plate 52 is formed in an inverted L shape in a right side view and, on the upper surface of the seat 51, and is fixed to an inner surface of the right support member (not shown in the drawings) by a screw (not shown in the drawings), via a spacer 571 that has a long thin plate shape and extends in the front-rear direction. In this way, the right side face plate 52 is provided standing on the upper surface of the seat 51. The cloth P is attached to the attachment plate 56. For example, when the cloth P is a T-shirt, the T-shirt is attached to the attachment plate 56 such that the neck of the T-shirt is positioned at the front, and the hem of the T-shirt is positioned at the rear.

In a similar manner to the right side face plate 52, the left side face plate 53 is fixed by a screw (not shown in the drawings) on the upper surface of the seat 51, via a spacer 581 that has a long thin plate shape and extends in the front-rear direction. In this way, on the upper surface of the seat 51, the left side face plate 53 is provided standing in parallel to the right side face plate 52.

Electrical Configuration of Print System 1

The electrical configuration of the print system 1 will be described with reference to FIG. 3. The print system 1 is provided with at least a conveyance control device 1A. The conveyance control device 1A is provided with the CPU 101, a ROM 102, a RAM 103, an input/output portion 111, and drive circuits 121 to 127, which are mutually connected via a bus. Further, a storage portion 104, the pretreatment devices 2A and 2B, the printers 3A to 5D, an operation portion 110, the proximity sensors 70 to 77, the code reader 95, the longitudinal belt motor 131, the lateral belt motor 132, the lateral raising/lowering belt motor 133, the lateral conveyance belt motor 134, the first raising/lowering motor 135, the second raising/lowering motor 136, the conveyance motor 137, and the like are connected to the conveyance control device 1A.

The CPU 101 controls operations of the print system 1. The ROM 102 stores various programs. The RAM 103 temporarily stores various types of information. The RAM 103 stores printer specifications 103A to be described later, and the like. The storage portion 104 is a non-volatile flash memory, and stores various types of information, such as a priority table 104A to be described later, and the like. The operation portion 110 receives various inputs from an operator. The operation portion 110 may be a touch panel (not shown in the drawings), and may display various types of information, in addition to receiving the various inputs. The input/output portion 111 is provided with an SD memory card slot, a USB (registered trademark) port, a serial port of another standard, and the like.

The drive circuit 121 controls the operation of the longitudinal belt motor 131 on the basis of a control command from the CPU 101. The drive circuit 122 controls the operation of the lateral belt motor 132 on the basis of a control command from the CPU 101. The drive circuit 123 controls the operation of the lateral raising/lowering belt motor 133 on the basis of a control command from the CPU 101. The drive circuit 124 controls the operation of the lateral conveyance belt motor 134 on the basis of a control command from the CPU 101. The drive circuit 125 controls the operation of the first raising/lowering motor 135 on the basis of a control command from the CPU 101. The drive circuit 126 controls the operation of the second raising/lowering motor 136 on the basis of a control command from the CPU 101. The drive circuit 127 controls the operation of the conveyance motor 137 on the basis of a control command from the CPU 101.

Stepping motors may be used as each of the motors configuring the platen conveyance mechanism 10. In this case, encoders are connected to each of the motors, and the CPU 101 can recognize the position of each of the motors as a result of position information of the motors being transmitted to the CPU 101 from each of the encoders.

Print Lane Determination Processing

Next, print lane determination processing will be explained with reference to FIG. 4 to FIG. 9. As an example, processing is described that decides which of the printers 3A to 5D of the first lane 81 to the fourth lane 84 the platen 50, to which the cloth P is attached, is to be conveyed to. In the print lane determination processing shown in FIG. 4, during a period up to when the platen 50 is moved from the preparation position 100 to a branch point 11B between the first lane 81 and the second lane 82, the CPU 101 determines which of the lanes the platen 50 is to be conveyed to.

Figure 4:
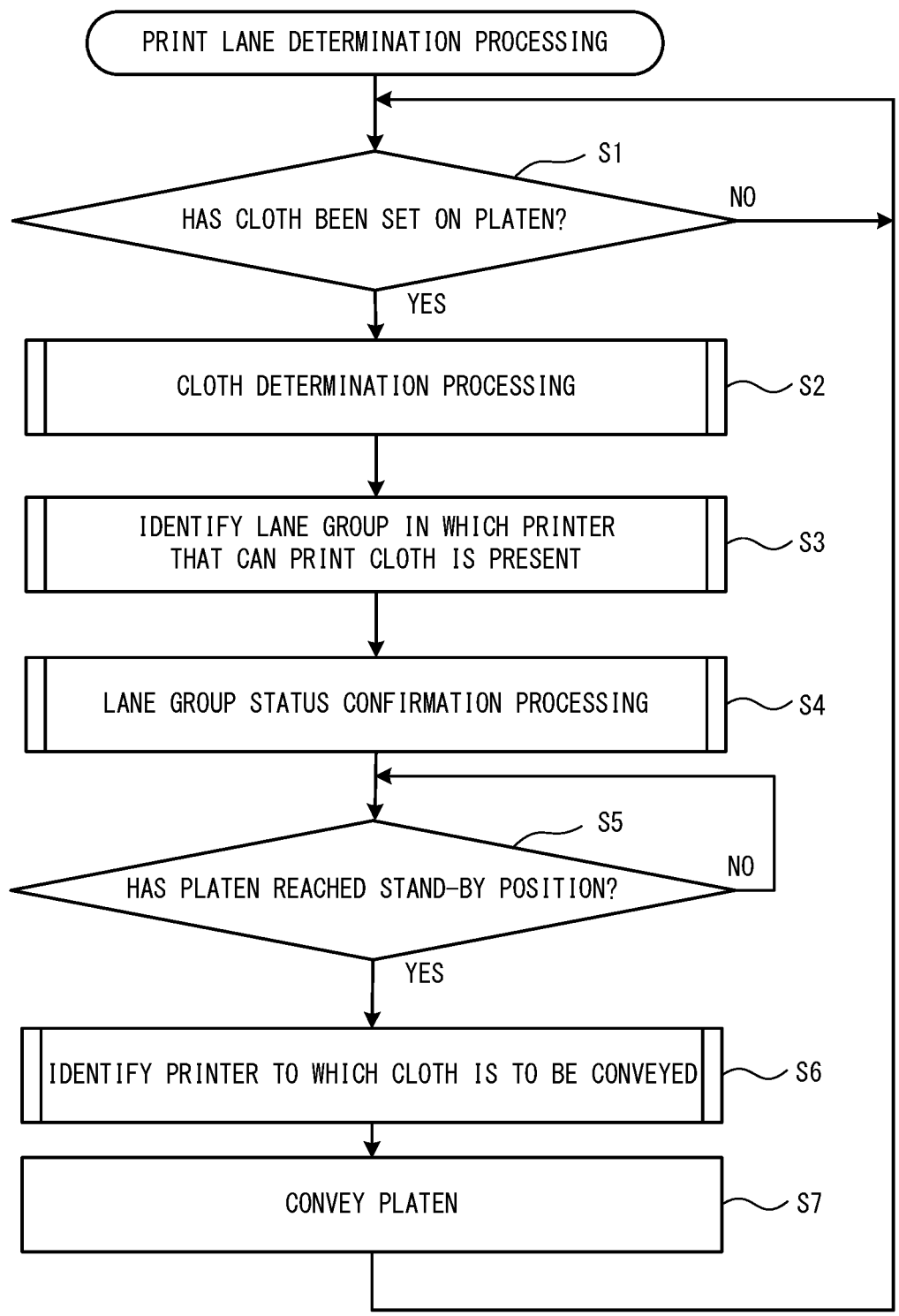
FIG. 4 is a flowchart of print lane determination processing.

First, when a power source of the print system 1 is turned on, the CPU 101 reads out, from the ROM 102, a program for the print lane determination processing shown in FIG. 4, and performs the print lane determination processing. As shown in FIG. 4, first, the CPU 101 determines whether a setting completion command, which indicates that the recording medium, such as the cloth P, is placed on the platen 50 positioned at the preparation position 100, has been received (step S1). For example, when the operator uses the code reader 95 and reads out the identification information of the cloth P from a barcode or an RFID tag on the cloth P placed on the platen 50, the code reader 95 transmits the identification information to the CPU 101. The CPU 101 stores the identification information of the cloth P in the RAM 103. When the CPU 101 receives the identification information of the cloth P from the code reader 95, the CPU 101 determines that the cloth P has been set on the platen 50 (yes at step S1). Next, the CPU 101 performs cloth determination processing (step S2). Note that, at step S1, the CPU 101 continues the determination at step S1 when the determination is not yes.

Figure 5:
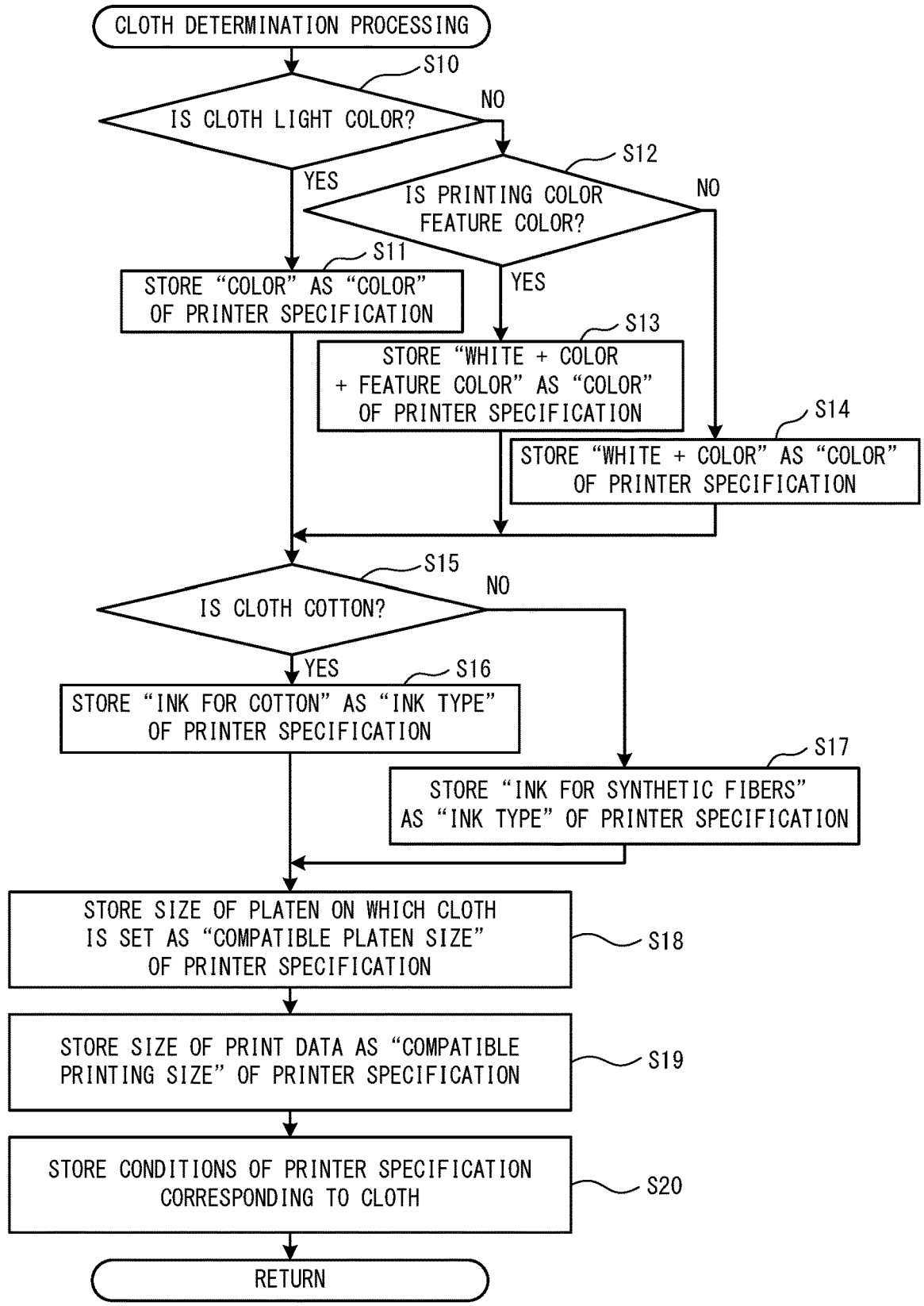
FIG. 5 is a flowchart of cloth determination processing.
Figure 6:
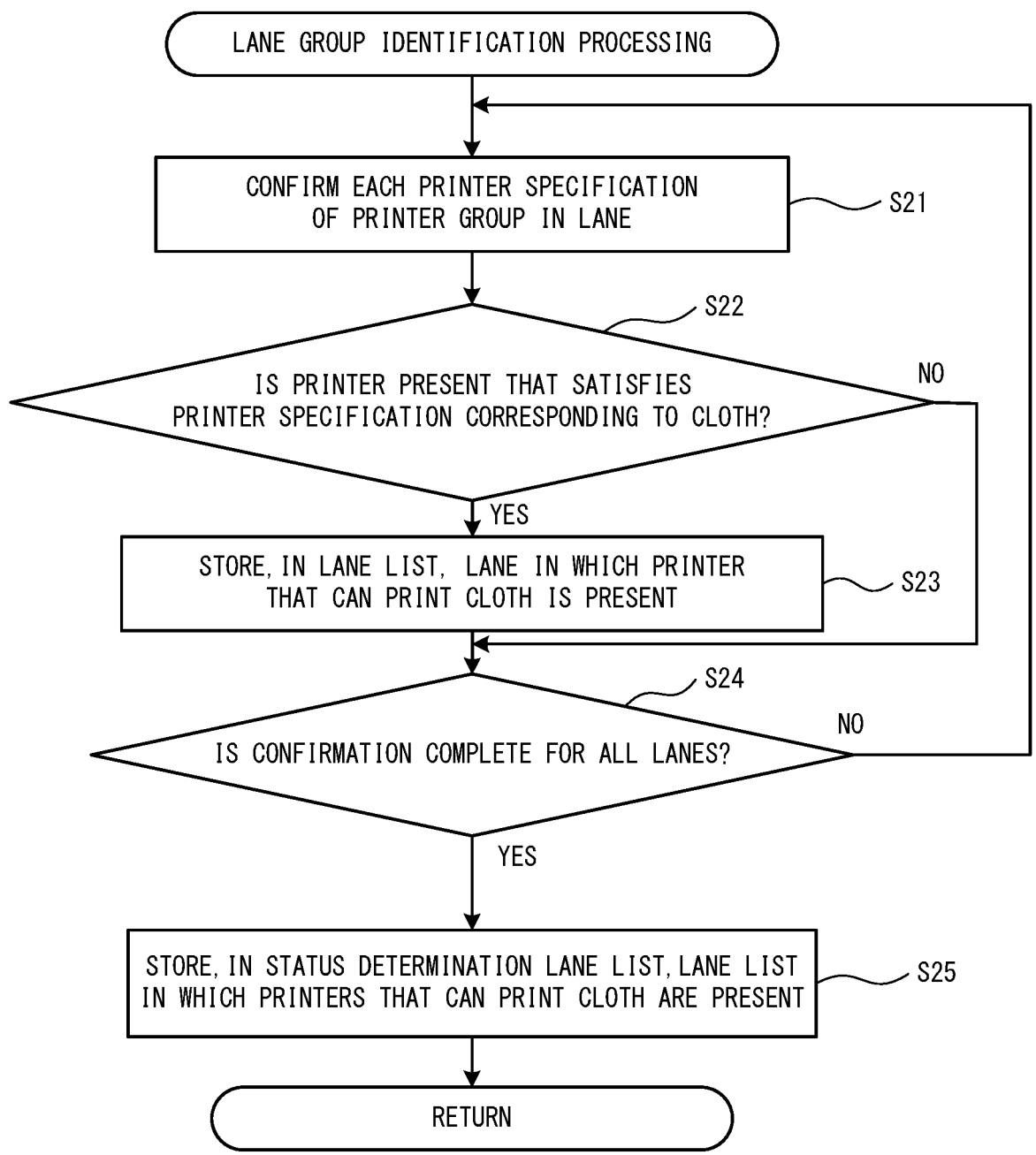
FIG. 6 is a flowchart of lane group identification processing.

The CPU 101 performs the cloth determination processing (step S2) in accordance with a subroutine of the cloth determination processing shown in FIG. 5. In the cloth determination processing, the CPU 101 creates the printer specification 103A, which is a list of specifications (conditions) of the printer demanded for printing the targeted cloth P, on the basis of the identification information of the cloth P received from the code reader 95 and stored in the RAM 103. Hereinafter, the cloth determination processing will be described with reference to FIG. 5 and FIG. 8A to FIG. 8C.

The printer specification 103A to be created will be explained with reference to FIG. 8A. Note that the printer specification 103A shown in FIG. 8A is a printer specification for the purpose of explanation. The storage portion 104 stores a format of the printer specification 103A. Items such as "Color," "Ink type," "Compatible platen size," and "Compatible printing size" can be input into the format. In the cloth determination processing to be described later, on the basis of the identification information of the cloth P received from the code reader 95 and stored in the RAM 103, predetermined information is associated with these items and stored as the printer specification 103A. For example, under "Color," one of the following is stored: color, white+ color, or white+color+feature color. Under "Ink type," one of the following is stored: ink for cotton, or ink for synthetic fibers. Under "Compatible platen size," one of the following is stored: size L, size M, or size S. Under "Compatible printing size," a size of a print image to be printed is stored.

Figure 8B:
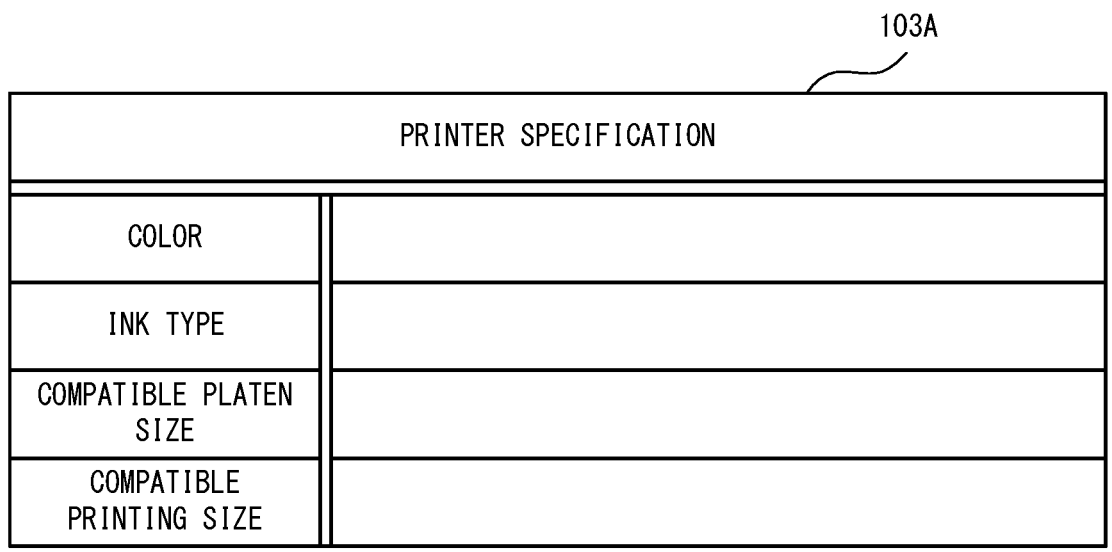
FIG. 8B is printer specifications.

In a state before the cloth determination processing is performed, each of the items in the printer specification 103A is a blank field, as shown in FIG. 8B. In an example below, from "Type," "Color," "Size," "Printing color," and "Printing size" included in the identification information of the cloth P, using predetermined conversion information stored in the storage portion 104, the CPU 101 can input each of the items of the printer specification 103A.

In the cloth determination processing shown in FIG. 5, first, the CPU 101 determines whether the cloth P placed on the platen 50 is a light color (step S10). The CPU 101 determines whether the cloth P is the light color on the basis of the "Color" of the identification information of the cloth P stored at step S1. For example, when "Color" in the identification information of the cloth P is white (step S11), the CPU 101 determines that the cloth P is the light color. When the CPU 101 determines that the cloth P is the light color (yes at step S10), the CPU 101 stores color as the "Color" of the printer specification 103A and advances the processing to step S15. When the CPU 101 determines that the color of the cloth P is the light color (yes at step S10), base printing of a white color is not necessary. Thus, the printing can also be performed using the printers 5A to 5D that are not provided with the white ink.

When the CPU 101 determines that the cloth P is not the light color (no at step S10), the CPU 101 determines whether the printing color is the feature color (step S12). The CPU 101 determines whether the printing color includes the feature color on the basis of the "Printing color" for the cloth P stored at step S1. For example, when the "Printing color" of the identification information of the cloth P includes red, the CPU 101 determines that the printing color is the feature color. When the CPU 101 determines that the printing color is the feature color (yes at step S12), the CPU 101 stores white+color+feature color as the "Color" of the printer specification 103A (step S13), and advances the processing to step S15. When the CPU 101 determines that the printing color is the feature color (yes at step S12), it is necessary to perform the printing using the feature color ink. Thus, the printing can only be performed using the printers 3A to 3D that are provided with the feature color ink.

When the CPU 101 determines that the printing color is not the feature color (no at step S12), the CPU 101 stores white+color as the "Color" of the printer specification 103A (step S14), and advances the processing to step S15. Since the color of the cloth P is not the light color, namely, is a dark color, it is necessary to perform the printing using the base printing using the white ink. Thus, the printing is not preferably performed using the printers 5A to 5D that are not provided with the white ink.

Next, the CPU 101 determines whether the cloth P is cotton (step S15). The CPU 101 determines whether the cloth P is cotton by acquiring information about a material of the cloth P, on the basis of "Type" in the identification information of the cloth P stored in the RAM 103. For example, when the CPU 101 determines that the cloth P is not cotton (no at step S15), the CPU 101 stores an ink suited to the information of the material of the cloth P, in the "Ink type" field of the printer specification 103A. In the present embodiment, in order to simplify the explanation, an example is explained in which the material of the cloth P other than cotton is the synthetic fiber. Thus, the CPU 101 stores ink for synthetic fibers as the "Ink type" of the printer specification 103A (step S17). When the CPU 101 determines that the cloth P is cotton (yes at step S15), the CPU 101 stores ink for cotton as the "Ink type" of the printer specification 103A (step S16).

Next, the CPU 101 stores, in the "Compatible platen size" field of the printer specification 103A, the size of the platen on which the cloth P is to be set (step S18). For example, there are three types of size of the platen 50, namely, S, M, and L, and the size of the cloth P that can be attached to the platen 50 is determined in advance. For example, the S-sized cloth P can be attached to the size S platen 50, the S-sized and M-sized cloth P can be attached to the size M platen 50, and the S-sized, M-sized, and L-sized cloth P can be attached to the size L platen 50. For example, the CPU 101 stores, in the "Compatible platen size" field of the printer specification 103A, the size of the platen 50 to which the cloth P can be attached, on the basis of "Size" in the identification information of the cloth P stored in the RAM 103. For example, when the cloth P is the L-sized cloth P, the CPU 101 stores size L as the "Compatible platen size" of the printer specification 103A.

Next, the CPU 101 stores a printing size of print data in the "Compatible printing size" field of the printer specification 103A (step S19). The CPU 101 acquires the print data corresponding to the identification information, from the storage portion 104, on the basis of "Printing size" in the identification information of the cloth P stored in the RAM 103. The CPU 101 acquires the printing size from the acquired print data, and stores the acquired printing size in the "Compatible printing size" field of the printer specification 103A. An example of the compatible printing size is W inches (W) and Z inches (H). Next, as shown in FIG. 8C, the CPU 101 stores the completed printer specification 103A corresponding to the cloth P in the RAM 103 (step S20). Thus, it is necessary for the printer that can perform the printing on the cloth P to satisfy the conditions of the printer specification 103A shown in FIG. 8C. In the present example, for example, these are the conditions requiring the printer that can perform the color printing, can eject the ink for the synthetic fibers, can use the size L platen 50, and can print an image of W inches (W) and Z inches (H).

Next, the CPU 101 advances the processing to step S3 shown in FIG. 4, and identifies a lane group on which the printers are present that can print the cloth P (step S3). The CPU 101 performs the processing at step S3 in accordance with a subroutine of lane group identification processing shown in FIG. 6. Hereinafter, the lane group identification processing to identify the lane group that is able to print the cloth P will be described with reference to FIG. 6. First, the CPU 101 confirms each of printer specifications of a printer group in the first lane 81 (step S21). For example, the CPU 101 communicates with each of the printers 3A to 5A of the first lane 81, acquires data about the color of the ink that can be ejected, the type of the ink (the ink for cotton, the ink for synthetic fibers), the size of the platen that the printer can handle, and the printing size that the printer can handle, and confirms the printer specification of each of the printers 3A to 5A. The CPU 101 associates the printer specification of each of the printers 3A to 5A with the respective printers 3A to 5A, and stores the associated information in the RAM 103 (step S21). Note that the processing at step S21 may be performed in advance and not at this timing.

Next, the CPU 101 determines whether the printer is present that satisfies the printer specification 103A (refer to FIG. 8C) corresponding to the cloth P created in the cloth determination processing and stored in the RAM 103 (step S22). For example, the CPU 101 determines YES when, among the printer specifications of each of the printers 3A to 5A acquired at step S21 and stored in the RAM 103, the printer specification is present that satisfies the "Color," "Ink type," "Compatible platen size," and "Compatible printing size" of the printer specification 103A stored at step S20. When the CPU 101 determines YES in the determination at step S22, the CPU 101 stores the first lane 81 in which the printer is present that can print the cloth P, in a lane list (not shown in the drawings) stored in the RAM 103 (step S23). For example, when the specifications of the printers 3A, 4A, and 5A indicate that the printers 3A, 4A, and 5A can perform the color printing, can eject the ink for the synthetic fibers, can use the size L platen, and can print the image of W inches (W) and Z inches (H), the specifications satisfy the printer specification 103A shown in FIG. 8C. Thus, the CPU 101 stores the first lane 81, on which the printers 3A to 5A are present, in the lane list. Note that information relating to the arrangement of the printers 3A to 5D provided on each of the first lane 81 to the fourth lane 84 is stored in the ROM 102 in advance. For example, when at least one of the printers 3A to 5A satisfies the printer specification 103A, the CPU 101 stores the first lane 81 in the lane list. When the CPU 101 determines NO in the determination at step S22, the CPU 101 advances the processing to step S24 to be described later.

Next, the CPU 101 determines whether the confirmation is complete for all of the lanes (step S24). In the above example, the CPU 101 has only confirmed the first lane 81, and has not confirmed the second lane 82 to the fourth lane 84. Thus, the CPU 101 determines NO in the determination processing at step S24, and returns the processing to step S21. Next, in a similar manner, the CPU 101 performs the processing from step S21 to step S23 with respect to the second lane 82. Next, the CPU 101 determines NO in the determination processing at step S24, and returns the processing to step S21. Next, in a similar manner, the CPU 101 performs the processing from step S21 to step S23 with respect to the third lane 83. Next, the CPU 101 determines NO in the determination processing at step S24, and returns the processing to step S21. Next, in a similar manner, the CPU 101 performs the processing from step S21 to step S23 with respect to the fourth lane 84. When the CPU 101 finishes the determination as to whether or not the printers in all of the lanes from the first lane 81 to the fourth lane 84 satisfy the printer specification corresponding to the cloth P, the CPU 101 determines that the confirmation of all the lanes is complete (yes at step S24). Further, when the CPU 101 determines that the confirmation of all the lanes is complete (yes at step S24), the CPU 101 stores the lane list in which the printers that can print the cloth P are present in a status determination lane list (not shown in the drawings) that is used to perform status determination (step S25). For example, the status determination lane list is stored in the RAM 103. For example, when the printers that can print the cloth P are the printers 3A to 5A, only the first lane 81 is stored in the lane list on which the printers that can print the cloth P are present, and thus, the CPU 101 stores the first lane 81 in the status determination lane list (step S25).

Next, the CPU 101 advances the processing to step S4 shown in FIG. 4, and performs lane group status confirmation processing (step S4). The CPU 101 performs the processing at step S4 in accordance with a subroutine of the lane group status confirmation processing shown in FIG. 7. For example, when the first lane 81 is present in the status determination lane list, the first lane 81 is a target of the determination processing at step S4.

Hereinafter, the lane group status confirmation processing will be described with reference to FIG. 7. First, the CPU 101 determines whether, of processing devices apart from the printers 3A to 5A provided in the first lane 81 stored in the status determination lane list, a device is present that is unable to perform processing (step S31). For example, the pretreatment device 2A that is the processing device other than the printers 3A to 5A is provided in the first lane 81. The CPU 101 receives, from the pretreatment device 2A, a status signal indicating a state of the device, and determines whether the device is unable to perform the processing. When a post-treatment device that is not shown in the drawings is provided in the first lane 81, the pretreatment device 2A and the post-treatment device are an example of the processing device other than the printers 3A to 5A. In this case, the CPU 101 receives the status signal indicating the status of the device from the post-treatment device also, and determines whether the device is unable to perform the processing. When the CPU 101 determines that the processing device, other than the printers 3A to 5A, that is unable to perform the processing is present (yes at step S31), the CPU 101 advances the processing to step S35 to be described later. When the CPU 101 determines that the processing device, other than the printers 3A to 5A, that is unable to perform the processing is not present (no at step S31), the CPU 101 determines whether the printer that is in a printable state is present (step S32). For example, the CPU 101 communicates with each of the printers 3A to 5A, receives a status signal indicating the state of each of the printers 3A to 5A, and determines whether the printer that is in the printable state is present. Next, when the CPU 101 determines that the printer that is in the printable state is present (yes at step S32), the CPU 101 stores and saves, in the RAM 103, a priority of the printer that can perform the printing (step S33).

An example of the priority of the printer will be described with reference to a priority table 104A shown in FIG. 9. The priority table 104A is created in advance and stored in the storage portion 104. States of the printers, an order of priority, details of the states, and supplementary information are stored in the priority table 104A. The printers include printers that indicate a printable state and printers that indicate an unprintable state. For example, the printers indicating the printable state are ranked first to fifth in the order of priority, and the smaller the number, the higher the priority. The first priority indicates that the printing can be immediately performed by the printer and that the platen 50 is not present in the printer. The second priority indicates that the printing is being performed by the printer, and that it will take 20 seconds or less until the printing is complete. The third priority indicates that the printing is being performed by the printer, and that it will take more than 20 seconds and 40 seconds or less until the printing is complete. The fourth priority indicates that the printing is being performed by the printer, and that it will take 10 seconds to convey the platen 50 into the printer and thereafter it will take more than 40 seconds and 60 seconds or less until the printing is complete. The fifth priority indicates that an operation other than the printing operation, such as a maintenance operation, is being performed on the printer, and that 30 seconds are required for the operation and thereafter it will take more than 40 seconds and 60 seconds or less until the printing is complete. Examples of the maintenance operation include flushing of the ink before the printing, wiping of the head, and the like. The maintenance operation is performed each time twenty recording media are printed, for example. The printable state is prescribed in advance using, as a reference, a time period required to complete the printing, for example. The printable state includes, for example, a case in which the printing can be immediately started by the printer, and a case in which, although other printing is currently being performed and the printing cannot be immediately started, new printing can be started after a predetermined time period and the printing can be completed within a predetermined time period. The unprintable state is a state other than the printable state.

The printers indicating the unprintable state include printers that are ranked sixth to eighth in the order of priority, for example, and three printers that are out of target (denoted by an x mark). The smaller the number, the higher the priority. Operations during which the printing by the printers 3A to 5D is impossible include a periodic operation that is performed periodically and an irregular operation that is performed on an irregular basis. With respect to the periodic operation, estimation of an end time is possible, and with respect to the irregular operation, the estimation of the end time is impossible. The periodic operation is, for example, a related operation for which the operation end time can be calculated. Examples of the related operation include a periodic replenishment operation of the ink that is supplied to the printers 3A to 5D and the maintenance operation for the printers 3A to 5D. The maintenance operation that is completed within 30 seconds or less may correspond to the fifth priority. Examples of the maintenance operation include a periodic purge operation that sucks up the ink from nozzles (not shown in the drawings) of the head (not shown in the drawings), a periodic flushing operation that ejects the ink from the nozzles of the head, a periodic wipe operation that wipes a nozzle surface (not shown in the drawings) of the head using a wiper, a periodic circulation operation that circulates the ink inside an ink supply path (not shown in the drawings) and the head, and a periodic agitation operation that agitates the ink inside an ink tank (not shown in the drawings). The maintenance operation may be a periodic operation regardless of the maintenance completion time. The related operation includes a carrying-in operation or a carrying-out operation of the platen 50 at the preparation position 100.

The sixth priority indicates that periodic replacement of an ink cartridge is in progress or that the replenishment of the ink to the ink tank is in progress. The seventh priority indicates that the platen 50 is being discharged from the printer. The eighth priority indicates that the purging of the ink from the head (not shown in the drawings) is in progress. The periodic purge operation is performed once in every six to seven hours, for example, and it takes about five to six minutes. The sixth to eighth priorities indicate the periodic operation of the printer. "Out of target" (denoted by the × mark) indicates the irregular operation, and indicates the power source OFF of the printer, a MACHINE ERROR such as ink empty, and opening of a printer cover.

Figure 10:
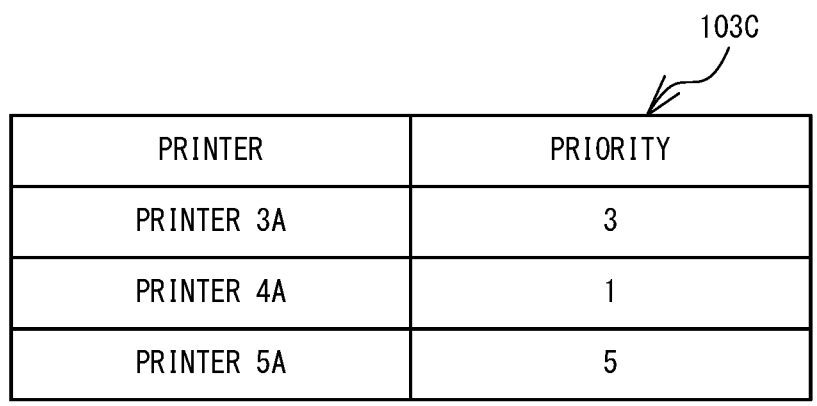
FIG. 10 is a conveyable printer list.

Next, the CPU 101 stores and saves the order of priority of the printers in the RAM 103 (step S33). Next, as shown in FIG. 10, the CPU 101 adds the priority of the printer stored in the RAM 103 at step S33, in association with the printer that can perform the printing, to a conveyable printer list 103C (step S34). For example, when all the printers 3A to 5A indicate the printable state, when the priority is "3" for the printer 3A, "1" for the printer 4A and "5" for the printer 5A, the CPU 101 stores the printer 3A in a printer field of the conveyable printer list 103C, and stores 3 in a priority field. Further, the CPU 101 stores the printer 4A in the printer field and stores 1 in the priority field, and further stores the printer 5A in the printer field and stores 5 in the priority field.

Next, the CPU 101 determines whether the confirmation is complete for all the target lanes (step S35). In the present example, as described above, the CPU 101 has performed the processing from step S31 to step S34 for the first lane 81 as the target lane, and thus, when the CPU 101 completes the confirmation for the printers 3A to 5A of the first lane 81, the CPU 101 determines that the confirmation of all the target lanes is complete (yes at step S35). When the CPU 101 determines YES in the determination at step S31, or when the CPU 101 determines NO in the determination at step S32, the CPU 101 advances the processing to step S35. When the lane other than the first lane 81 is registered in the status determination lane list, when the CPU 101 completes the processing from step S31 to step S34 with respect to all of the lanes registered in the lane list, the CPU 101 determines that the confirmation is complete for all of the lanes (yes at step S35). When the CPU 101 determines that the confirmation is not complete for all of the lanes (no at step S35), the CPU 101 returns the processing to step S31.

When the CPU 101 determines that the confirmation is complete for all of the lanes (yes at step S35), the CPU 101 decides the printer to which the platen 50 is to be conveyed, using the priority from the conveyable printer list 103C stored in the RAM 103 (step S36). The CPU 101 decides the printer having a higher priority, from among the printers stored in the conveyable printer list 103C, as the printer to which the platen 50 is to be conveyed. When the priorities of the printers are the same as each other, the CPU 101 decides, for example, the printer closer to the preparation position 100 as the printer to which the platen 50 is to be conveyed (step S36). In the conveyable printer list 103C shown in FIG. 10, the printer 4A having the priority of "1" is the printer with the highest priority, and thus, the CPU 101 decides the printer 4A to be the printer to which the platen 50 is to be conveyed (step S36). Next, the CPU 101 specifies the lane in which the decided printer is present to be a conveyance destination (step S37). For example, the CPU 101 specifies the first lane 81 in which the printer 4A is present as the conveyance destination of the platen 50.

Next, the CPU 101 advances the processing to step S5 shown in FIG. 4. The CPU 101 determines whether the platen 50 has reached the standby position 14F (step S5). For example, when the detection signal for the platen 50 is received from the proximity sensor 70 (refer to FIG. 1) provided at the standby position 14F, the CPU 101 determines that the platen 50 has reached the standby position 14F (yes at step S5). When the detection signal for the platen 50 is not received from the proximity sensor 70, the CPU 101 continues the determination at step S5. Next, when it is determined that the platen 50 has reached the standby position 14F (yes at step S5), the CPU 101 advances the processing to step S6 shown in FIG. 4. The CPU 101 identifies the printer to which the cloth P is to be conveyed (step S6). The CPU 101 performs the processing at step S6 after the platen 50 has reached the standby position 14F. The CPU 101 performs the processing at step S6 in accordance with a subroutine of conveyance destination determination processing shown in FIG. 11.

Conveyance Destination Determination Processing for Platen 50

Figure 11:
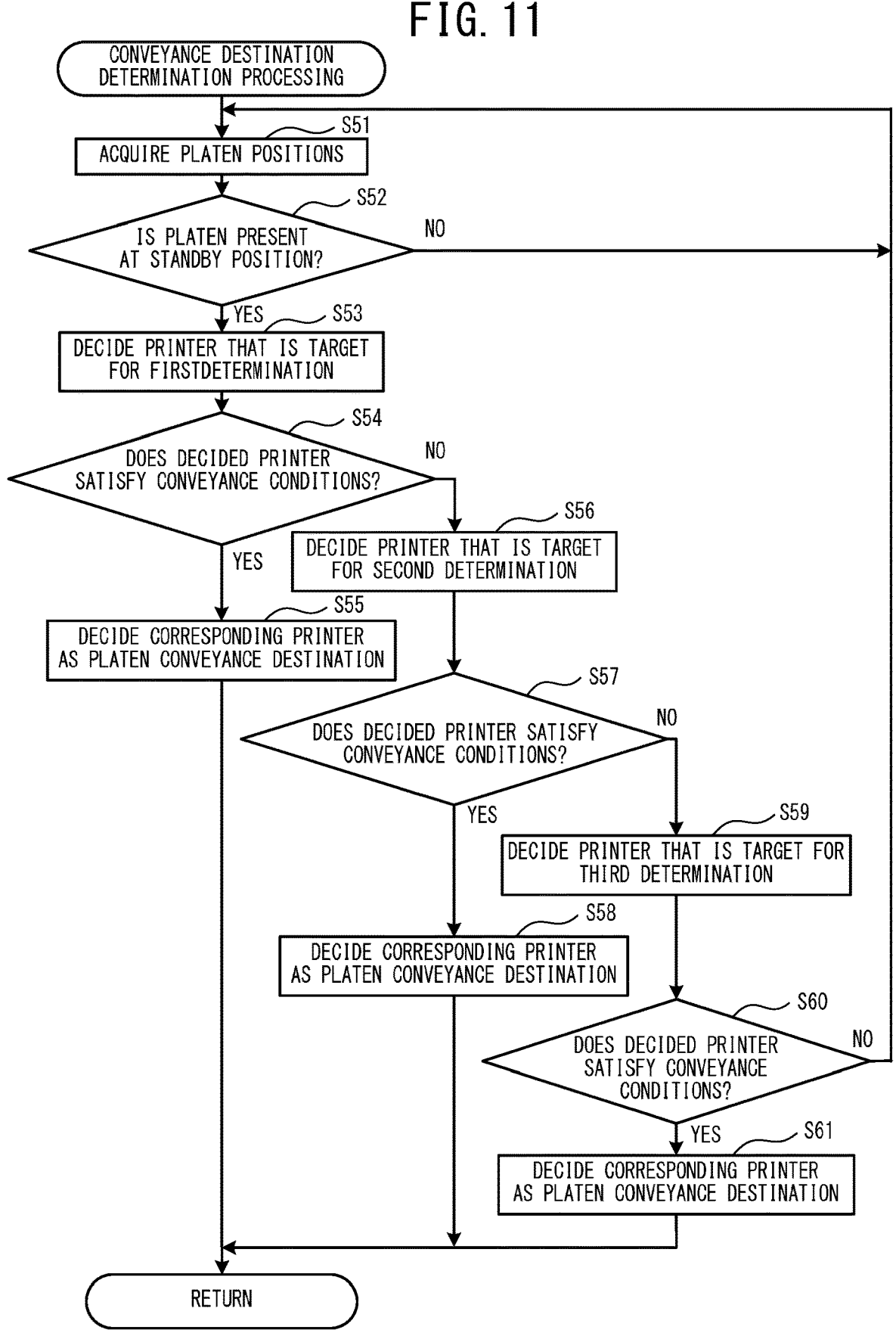
FIG. 11 is a flowchart of conveyance destination determination processing.

Next, conveyance destination determination processing will be described with reference to FIG. 11 and FIG. 12. There is a case in which, during a period in which the platen 50 moves from the preparation position 100 to the branch point 11B, the state of the printers 3A to 5A changes. For example, it is conceivable that the printers 3A to 5A may enter into the unprintable state. Thus, the CPU 101 decides to which of the printers 3A to 5A the platen 50 is to be conveyed, after the platen 50 has passed beyond the branch point 11B and has reached the standby position 14F of the first lane 81. First, the CPU 101 acquires, from each of the proximity sensors 70 to 77 and each of the printers 3A to 5A provided in the platen conveyance mechanism 10 of the print system 1, the positions of each of the platens 50 that have already been dispatched and are being conveyed (step S51). For example, the CPU 101 acquires signals indicating whether the platens 50 are present at the standby position 14F, the first conveyance path 14G, the second conveyance path 15B, the third conveyance path 14H, the fourth conveyance path 17B, the fifth conveyance path 14I, the sixth conveyance path 19B, the seventh conveyance path 14J, and each of the printers 3A to 5A. Next, the CPU 101 determines whether the platen 50 is at the standby position 14F (step S52). For example, when the CPU 101 is receiving the detection signal for the platen 50 from the proximity sensor 70 of the standby position 14F, the CPU 101 determines that the platen 50 is at the standby position 14F. When the CPU 101 determines that the platen 50 is not at the standby position 14F (no at step S52), the CPU 101 returns the processing to step S51.

When the CPU 101 determines that the platen 50 is at the standby position 14F (yes at step S52), the CPU 101 decides, from the printers 3A to 5A, the printer to be a target of a first determination (step S53). At step S54 to be described later, the CPU 101 determines whether or not to convey the platen 50 to the printer decided at step S53. The determination at step S54 will be referred to as the first determination. The CPU 101 selects the printer to be the target of the first determination from among the printers having the higher priorities in the priority table 104A shown in FIG. 9, and decides on this printer/makes the decision.

In the determination processing at step S53, the CPU 101 communicates with the printers 3A to 5A and receives status information from the printers 3A to 5A, and thus acquires the state of the printers 3A to 5A. The CPU 101 determines to which of the priorities in the priority table 104A the printer 3A to 5A correspond, and decides the printer for which the priority number is smallest (the printer having the highest priority) to be the target of the first determination. When, for example, the printers 3A to 5A are already printing the platen 50 that has been conveyed before, the CPU 101 may calculate the time up to when the print processing on the platen 50 conveyed before will be complete, may calculate the time up to when the printing by the printer will start, and may determine to which of the second to fifth priorities in the priority table 104A the printer corresponds. For example, when the printer 3A corresponds to the third priority, the printer 4A corresponds to the first priority, and the printer 5A corresponds to the fifth priority, the CPU 101 decides the printer 4A for which the priority is "1" as the printer to be the target for the first determination (step S53). When the priorities of the printers are the same as each other, the CPU 101 decides, for example, the printer closer to the standby position 14F as the printer to be the target of the first determination. Further, it is preferable for the states of all the printers 3A to 5A to be categorized and established in advance in the priority table 104A. However, in the determination at step S53, for example, if none of the states of the printers 3A to 5A correspond to one of the states of the priority table 104A, the CPU 101 may treat the priority of the printers 3A to 5A as "×." In this case, the CPU 101 may return the processing to step S51 without advancing to step S54.

Next, the CPU 101 determines whether the printer 4A determined at step S53 satisfies conveyance conditions (step S54). The conveyance conditions under which the platen 50 can be conveyed to each of the printers 3A to 5A will be described with reference to FIG. 12A to FIG. 12C. The tables shown in FIG. 12A to FIG. 12C are tables showing the conveyance conditions to the printers 3A to 5A, and are created in advance and stored in the storage portion 104. In the tables in FIG. 12A to FIG. 12C, (ENTER) indicates that the conveyance path is used by the platen 50 that moves toward the printer. (EXIT) indicates that the conveyance path is used by the platen 50 discharged from the printer. "–" indicates that the platen 50 is not present at a particular position, such as the standby position 14F. "×" indicates that, when the platen 50 is present on the conveyance path or in the printer, the platen 50 at the standby position 14F is not to be conveyed to the printer. "Any" indicates that this item is not used as a determination factor for the conveyance of the platen 50 at the standby position 14F. In other words, "Any" indicates that the conveyance is possible regardless of whether another of the platens 50 is present on the conveyance path or in the printer. "GO" indicates that, although another of the platens 50 is present on the conveyance path or in the printer, the conveyance is possible when predetermined conditions are satisfied. Therefore, when the other platen 50 is present on the conveyance path or in the printer, when the predetermined conditions are not satisfied, "×" is assigned.

For example, as shown in FIG. 12B, conditions under which the CPU 101 can convey the platen 50 from the standby position 14F to the printer 4A are as follows. The platen 50 is not present on the first conveyance path 14G. The platen 50 moving toward the printer 3A is not present on the second conveyance path 15B. The platen 50 after the completion of printing is not present in the printer 3A. The platen 50 discharged from the printer 3A is not present on the second conveyance path 15B. The platen 50 moving toward the fourth conveyance path 17B is not present on the third conveyance path 14H. The platen 50 moving toward the printer 4A is not present on the fourth conveyance path 17B. The platen 50 is not present in the printer 4A.

Then, with respect to whether or not the platen 50 is present on the fourth conveyance path 17B (EXIT), the fifth conveyance path 14I, the sixth conveyance path 19B (ENTER), the printer 5A, the sixth conveyance path 19B (EXIT), and the seventh conveyance path 14J, to all of which "Any" is assigned, these items do not relate to the conditions under which the platen 50 can be conveyed from the standby position 14F to the printer 4A, and therefore are not used as the determination factors for the conveyance of the platen 50 at the standby position 14F. Note that, when the printer 3 is performing printing, is under maintenance, or is out of order, "GO" is assigned, and thus the CPU 101 can convey the platen 50 to the printer 4A. In a similar manner, even when the platen 50 moving toward the fifth conveyance path 14I is present on the third conveyance path 14H, since "GO" is assigned, conveyance to the printer 4A is able to be performed. Further, in the conveyance conditions shown in FIG. 12B, when the platen 50 is present in the printer 4A, it is indicated that the conveyance conditions are not satisfied, but the configuration is not limited thereto. "Any" may be assigned to corresponding positions of the printer 3A in the conveyance conditions to the printer 3A shown in FIG. 12A, to corresponding positions of the printer 4A in the conveyance conditions to the printer 4A shown in FIG. 12B, and to corresponding positions of the printer 5A in the conveyance conditions to the printer 5A shown in FIG. 12C. Further, these corresponding positions may be prescribed in association with the priority table 104A shown in FIG. 9. For example, the first to third priorities may be "GO," and the fourth to eighth priorities and "×" may be "×."

When all of the conveyance conditions for the platen positions acquired at step S51 are "GO" or "Any," the CPU 101 determines that the printer 4A decided at step S53 satisfies the conveyance conditions (yes at step S54). Thus, the CPU 101 decides that the printer 4A as the conveyance destination of the platen 50 (step S55). Next, the CPU 101 advances the processing to step S7 shown in FIG. 4, and conveys the platen 50 from the standby position 14F toward the printer 4A. The platen 50 moves from the standby position 14F to the printer 4A via the first conveyance path 14G, the third conveyance path 14H, and the fourth conveyance path 17B (step S7). The conveyance of the platen 50 is performed in accordance with the principles of the platen conveyance conditions described above. When the CPU 101 determines NO in the determination at step S54, the CPU 101 decides the printer that is a target for a second determination (step S56). At step S57 to be described later, the CPU 101 determines whether or not to convey the platen 50 to the printer decided at step S56. The determination at step S57 will be referred to as the second determination. The processing at step S56 is similar to that at step S53. For example, when the printer 3A corresponds to the third priority, the printer 4A corresponds to the first priority, and the printer 5A corresponds to the fifth priority, the CPU 101 decides the printer 3A, which is the printer following the printer 4A in the order of priority, as the printer that is the target for the second determination (step S56). Next, the CPU 101 determines whether the printer 3A decided at step S56 satisfies the conveyance conditions (step S57).

For example, as shown in FIG. 12A, conditions under which the platen 50 is able to be conveyed from the standby position 14F to the printer 3A are as follows. The platen 50 is not present at the standby position 14F. The platen 50 is not present on the first conveyance path 14G. The platen 50 moving toward the printer 3A is not present on the second conveyance path 15B. The platen 50 is not present in the printer 3A. The platen 50 discharged from the printer 3A is not present on the second conveyance path 15B. Then, with respect to whether or not the platen 50 is present on the third conveyance path 14H, the fourth conveyance path 17B (ENTER), the printer 4A, the fourth conveyance path 17B (EXIT), the fifth conveyance path 14I, the sixth conveyance path 19B (ENTER), the printer 5A, the sixth conveyance path 19B (EXIT), and the seventh conveyance path 14J, to all of which "Any" is assigned, these items do not relate to the conditions under which the platen 50 can be conveyed from the standby position 14F to the printer 3A, and therefore are not used as the determination factors for the conveyance of the platen 50 at the standby position 14F.

When all of the conveyance conditions for the platen positions acquired at step S51 are "GO" or "Any," the CPU 101 determines that the printer 3A decided at step S56 satisfies the conveyance conditions (yes at step S57). Next, the CPU 101 decides the printer 3A as the conveyance destination of the platen 50 (step S58). Next, the CPU 101 advances the processing to step S7 shown in FIG. 4, and conveys the platen 50 from the standby position 14F toward the printer 3A (step S7). The platen 50 is conveyed from the standby position 14F to the printer 3A via the first conveyance path 14G and the second conveyance path 15B. When the CPU 101 determines NO in the determination at step S57, the CPU 101 decides the printer that is a target for a third determination (step S59). At step S60 to be described later, the CPU 101 determines whether or not to convey the platen 50 to the printer decided at step S59. The determination at step S60 will be referred to as the third determination. The processing at step S59 is similar to that at step S53 and step S56. When the printer 3A corresponds to the third priority, the printer 4A corresponds to the first priority, and the printer 5A corresponds to the fifth priority, for example, the CPU 101 decides the printer 5A, which is the printer following the printer 3A in the order of priority, as the printer that is the target for the third determination (step S59). Next, on the basis of the platen positions acquired at step S51, the CPU 101 determines whether the printer 5A decided at step S59 satisfies the conveyance conditions (step S60).

For example, as shown in FIG. 12C, conditions under which the platen 50 is able to be conveyed from the standby position 14F to the printer 5A are as follows. The platen 50 is not present at the standby position 14F. The platen 50 is not present on the first conveyance path 14G. The platen 50 that is on the second conveyance path 15B to move toward the printer 3A is not used as the determination factor. The platen 50 after the completion of printing is not present in the printer 3A. The platen 50 discharged from the printer 3A is not present on the second conveyance path 15B. The platen 50 moving toward the sixth conveyance path 19B is not present on the third conveyance path 14H. The platen 50 that is on the fourth conveyance path 17B to move toward the printer 4A is not used as the determination factor. The platen 50 after the completion of printing is not present in the printer 4A. The fourth conveyance path 17B (EXIT) is not used as the determination factor. The platen 50 moving toward the sixth conveyance path 19B is not present on the fifth conveyance path 14I. The platen 50 is not present on the sixth conveyance path 19B (ENTER) and in the printer 5A. The sixth conveyance path 19B (EXIT) and the seventh conveyance path 14J are not used as the determination factor. Note that, when the printer 3A is performing printing, is under maintenance, or is out of order, "GO" is assigned, and thus the conveyance to the printer 5A is able to be performed. In a similar manner, even when the platen 50 moving toward the fourth conveyance path 17B or the seventh conveyance path 14J is present on the third conveyance path 14H, since "GO" is assigned, the conveyance to the printer 5A is able to be performed. When the printer 4A is performing printing, is under maintenance, or is out of order, since "GO" is assigned, the conveyance to the printer 5A is able to be performed. When the platen 50 moving toward the seventh conveyance path 14J is present on the fifth conveyance path 14I, since "GO" is assigned, the conveyance to the printer 5A is able to be performed.

When all of the conveyance conditions for the platen positions acquired at step S51 are "GO" or "Any," the CPU 101 determines that the printer 5A decided at step S59 satisfies all the conveyance conditions (yes at step S60). Next, the CPU 101 decides the printer 5A as the conveyance destination of the platen 50 (step S61). Next, the CPU 101 advances the processing to step S7 shown in FIG. 4, and conveys the platen 50 from the standby position 14F toward the printer 5A (step S7). The platen 50 is conveyed from the standby position 14F to the printer 5A via the first conveyance path 14G, the third conveyance path 14H, the fifth conveyance path 14I, and the sixth conveyance path 19B. When the CPU 101 determines NO in the determination at step S60, the CPU 101 returns the processing to step S51. Thus, the processing from step S51 to step S60 is repeated in the same manner as described above until the conveyable printer is decided. The CPU 101 returns the processing to step S1 after the processing at step S7.

Figure 7:
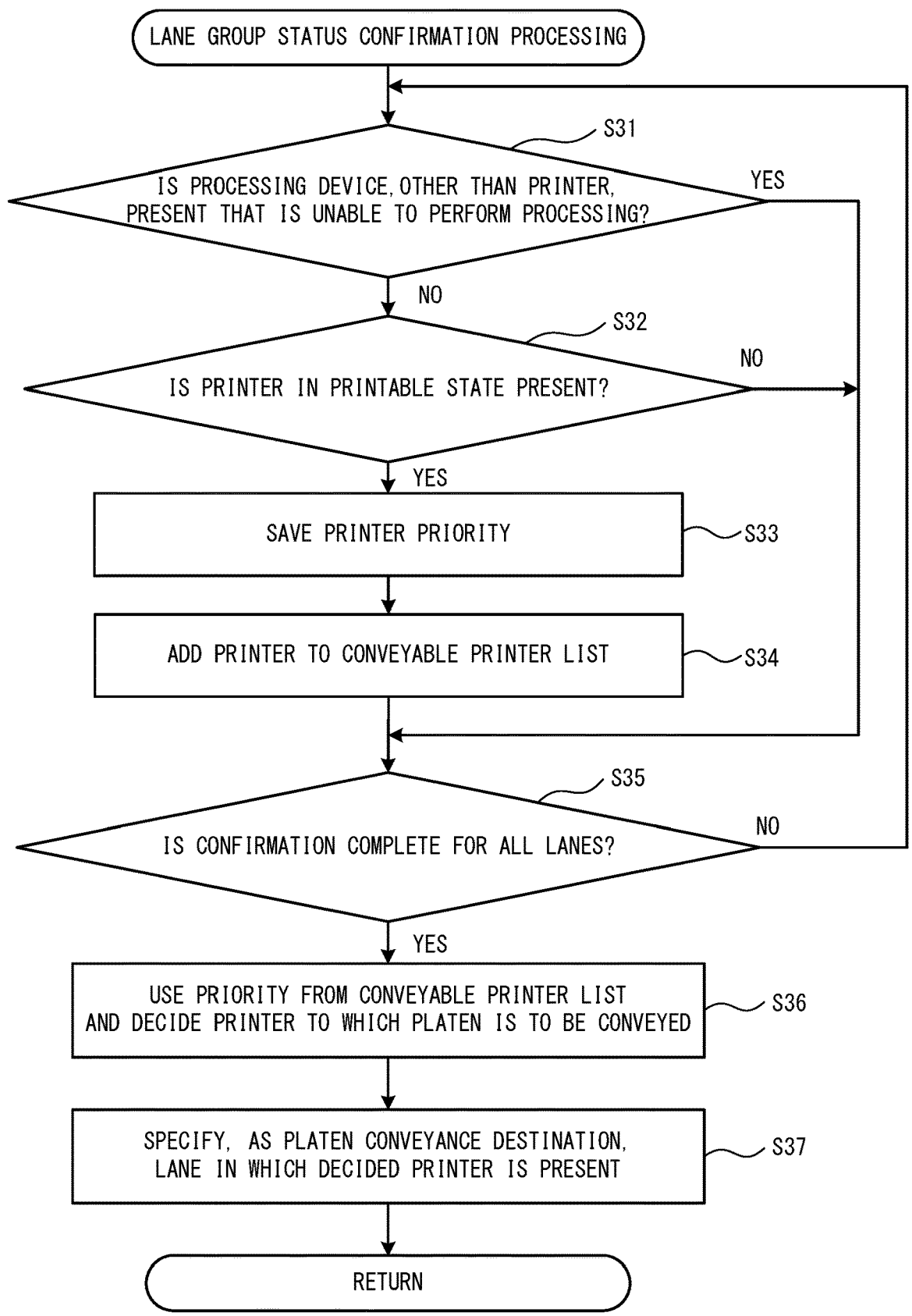
FIG. 7 is a flowchart of a lane group status confirmation processing.

Note that when, in the processing at step S36 shown in FIG. 7, the printer to which the platen 50 can be conveyed is not stored in the conveyable printer list, the CPU 101 does not decide the printer to which the platen 50 is to be conveyed. In this case, the CPU 101 advances the processing to step S6, without specifying the lane that is the conveyance destination of the platen 50 in the processing at step S37. The CPU 101 advances the processing to step S1 without identifying the printer to which the cloth P is to be conveyed in the processing at step S6, and without conveying the platen 50 in the processing at step S7, As described above, the conveyance control device 1A according to the present embodiment is provided with the CPU 101 that controls the platen conveyance mechanism 10 that conveys the platen 50 to any one of the plurality of printers from the preparation position 100 that is the conveyance start position of the platen 50, via the pretreatment devices 2A and 2B that perform the pretreatment on the cloth P placed on the platen 50. The CPU 101 performs the determination steps (step S2 to step S6) as to which of the plurality of printers 3A to 5D to convey the platen 50, on the basis of the cloth P placed on the platen 50. The CPU 101 determines whether to convey the platen 50 to the first lane 81 or to the second lane 82 on the basis of the cloth P placed on the platen 50, and thus, the platen 50 is conveyed to the lane provided with the printers 3A to 5D suitable for the cloth P. As a result, it is possible to increase the number of a print processing in a certain period. In the present embodiment, for example, the printer to which the platen 50 is conveyed is determined on the basis of the printer specification 103A. The printer specification 103A is related to the cloth P, and it can thus be said that whether to convey the platen 50 to the first lane 81 or to the second lane 82 is determined on the basis of the cloth P. Furthermore, it can also be said that "Color," "Compatible printing size," and the like are related to the print data, and thus, in the present invention, it can be said that whether to convey the platen 50 to the first lane 81 or to the second lane 82 is determined on the basis of the cloth P and the print data. In other words, in the present invention, "on the basis of the cloth P" can be said to mean "on the basis of the print data."

In the determination steps (step S2 to step S6), the CPU 101 determines to which lane to convey the platen 50 during the period in which the platen 50 moves from the preparation position 100 that is the conveyance start position of the platen 50 to the branch point 11B between the first lane 81 and the second lane 82. Thus, when the platen 50 has moved to the branch point 11B, the lane to which the platen 50 is to be conveyed is decided, and the platen 50 is conveyed to the appropriate lane. As a result, it is possible to increase the number of the print processing in the certain period.

In the determination steps (step S2 to step S6), the CPU 101 determines which, of a first printer group (the printers 3A to 5A) or a second printer group (the printers 3B to 5B) to convey the platen 50, on the basis of the state of the plurality of printers. Thus, of the first printer group and the second printer group, the platen 50 can be conveyed to the printer suitable for printing the cloth P.

In the determination steps (step S2 to step S6), the CPU 101 determines the printer of one of the first printer group and the second printer group to which the platen 50 is to be conveyed, after the platen 50 has moved from the preparation position 100 to the branch point 11B of the first lane 81 and the second lane 82. Thus, even if the state of the printer that is the conveyance destination of the platen 50 changes while the platen 50 moves to the branch point 11B, even after the platen 50 has moved to the branch point 11B, the printer suitable for printing the cloth P can be caused to be the conveyance destination of the platen 50.

The pretreatment devices 2A and 2B are respectively provided at the first lane 81, the second lane 82, the third lane 83, and the fourth lane 84, and in the determination step (step S31), the CPU 101 determines to which of the first lane 81, the second lane 82, the third lane 83, and the fourth lane 84 the platen 50 is to be conveyed, on the basis of the state of the pretreatment devices 2A and 2B. Thus, it is possible to not convey the platen 50 to the lane on which the pretreatment devices 2A and 2B are not in operation. As a result, it is possible to increase the number of the print processing in the certain period.

In the determination steps (step S2 to step S6), the CPU 101 determines which of the printers 3A to 5A the platen 50 is to be conveyed for each of the conveyed platens 50, and it is thus possible to convey the platen 50 to the printer suited to the platen 50. As a result, it is possible to increase the number of the print processing in the certain period.

The present invention is not limited to the above-described embodiment, and various modifications are possible. The print system 1 of the above-described embodiment may be provided with a post-treatment device. The post-treatment device is disposed to the rear of the printers 3A to 5D, and can improve the fixation of the ink on the cloth P by heating the printed cloth P supported by the platen 50 at a high temperature and drying the ink. Further, each of the pretreatment devices 2A and 2B may be an application portion only. The heat processing portion may be an oven that does not include a pressurizing function. Further, the pretreatment devices 2A and 2B may be respectively provided on each of the first lane 81 to fourth lane 84. Further, to the right of the fourth lane 84, the platen conveyance mechanism 10 may be further provided with a processing line provided with three printers, in the same manner as the first lane 81 and the second lane 82. Further, the number of printers on each of the lanes is not limited to three, and a given number of the printers, such as two, four or five printers, may be provided. If the number of printers increases, it is possible to increase the number of the print processing in the certain period. Further, printers that can perform high speed printing may be provided. An example of the printer that can perform high speed printing is a printer having a large number of heads, for example. Using the printer that can perform the high speed printing, it is possible to print the print data of a large printing size at high speed.

The priority table 104A is not limited to that shown in FIG. 9. It is sufficient that an appropriate table be created. Further, in the determination at step S36, when there are a plurality of the printers having the same priority level, instead of selecting the printer closer to the preparation position 100, the CPU 101 may select the printer for which a selection order is specified in advance. Further, the determination as to whether the recording medium has been set on the platen 50 (step S1) may be made when the operator places the cloth P on the platen 50 and inputs a set completion command from the operation portion 110 and the CPU 101 receives the set completion command. Further, in the determination as to whether the cloth P is the light color (step S11), the CPU 101 may make the determination on the basis of a command as to whether the cloth P is the light color or not input by the operator operating the operation portion 110. Further, in the determination as to whether the cloth P is the cotton or the synthetic fibers (step S12), the CPU 101 may make the determination on the basis of a command as to whether the cloth P is the cotton or the synthetic fibers input by the operator operating the operation portion 110. Further, the addition of the size of the platen 50 to the printer specification 103A (step S18) may be performed by the CPU 101 receiving a command indicating the size of the platen input from the operation portion 110. Further, the addition of the printing size to the printer specification 103A (step S19) may be performed by the CPU 101 receiving a command indicating the printing size input from the operation portion 110.

The CPU 101 performs the print lane determination processing shown in FIG. 4, but CPUs separate from the CPU 101 may be provided in each of the first lane 81, the conveyance mechanisms 15, 17, and 19, and the like, and these CPUs may perform the determination. Further, the determinations at step S54, step S57, and step S60 shown in FIG. 11 may be increased or reduced in accordance with the number of printers provided in a single lane. Note that the "first lane" of the present invention is not necessarily limited to the first lane 81 and may be the third lane 83. The "second lane" of the present invention is not necessarily limited to the second lane 82 and may be the fourth lane 84. Further, in the above-described embodiment, when the printer of the third determination also does not satisfy the conveyance conditions (no at step S60), the CPU 101 returns the processing to step S51. However, in the determinations at step S54, step S57, and step S60, when there is no printer that can perform the printing, the CPU 101 may convey the platen 50 to the printer in which the printing is not possible due to the periodic operation. It is thus possible to reduce a possibility that the platen 50 is not conveyed to the printer and the number of the print processing in the certain period deteriorates.

In the determination steps, when there is no printer that can perform the printing (no at step S54, step S56, no at step S57, step S59, no at step S60), the CPU 101 may calculate the time until the end of the related operation relating to the print functions of each of the printers, and may convey the platen 50 to the printer in which the printing is not possible at the current time due to the related operation, but for which the end time of the related operation is quickest. When the end times of the related operations are the same, the CPU 101 may convey the platen 50 to the printer closer to the stand-by position 14F. Further, when the end times of the related operations are the same, the CPU 101 may convey the platen 50 to the printer specified in advance. In this way, when there is no printer that can perform the printing, the CPU 101 can convey the platen 50 to the printer in which the printing is not possible due to the periodic operation for which the end time of the related operation is calculated. The related operation relates to the print function of the printer. It is thus possible to reduce a possibility that the platen 50 is not conveyed to the printer and the number of the print processing in the certain period deteriorates.

In addition, the conveyance conditions under which the platen 50 is conveyed to each of the printers 3A to 5A are not limited to those shown in FIG. 12A to FIG. 12C, and it is sufficient that the conveyance conditions be conditions that avoid mutual collision of the platen 50 to be conveyed with the already conveyed platen 50. Further, in the determination at step S53, when all the printers 3A to 5A indicate the unprintable state, the CPU 101 may decide, as the printer that is the target for the first determination, the printer having the highest priority among the printers corresponding to the sixth to eighth priorities. This also applies the processing at step S56 and step S59. Further, the conveyance conditions for conveying the platen 50 to each of the printers 3B to 5B, 3C to 5C, an 3D to 5D may be the same as those in FIG. 12A to FIG. 12C. Further, it is sufficient that the conveyance conditions for conveying the platen 50 to each of the printers 3B to 5B, 3C to 5C, an 3D to 5D be conditions that avoid mutual collision of the platen 50 to be conveyed with the already conveyed platen 50.

In addition, the number of the printers on the first lane 81 to the fourth lane 84 is not limited to three, and a given number of the printers, such as two, four or five printers, may be provided. If the number of printers increases, it is possible to increase the number of the print processing in the certain period. Further, although the three determination steps (step S54, step S57, step S60) are provided, the number of the determination steps is not necessarily limited to three and may be fewer, such as one or two, for example. Further, the number of the determination steps may be the same as the number of the printers provided on each of the lines, and when there are five printers, the number of the determination steps may be five. Further, even when there are the five printers, the number of the determination steps may be three or four. Further, the determination as to whether the recording medium has been set on the platen 50 (step S1) may be made when the operator places the cloth P on the platen 50 and inputs a set completion command from the operation portion 110 and the CPU 101 receives the set completion command. Further, although the CPU 101 acquires the states of the printers 3A to 5A in the determination at step S53, the CPU 101 may acquire the states of the printers 3A to 5A at step S56 and step S59 also, and may use the acquired states in the processing at step S56 and step S59. Further, in the above-described embodiment, the identification of the printer to which the cloth P is to be conveyed (step S6) is performed by the CPU 101 after the platen 50 has reached the stand-by position 14F, but the CPU 101 may identify the printer after the platen 50 has passed through the branch point 11B or before the platen 50 passes through the branch point 11B. The CPU 101 may identify the printer to which the cloth P is to be conveyed at any timing up to when the platen 50 reaches the stand-by position 14F (step S6).

When one of the platens 50 is conveyed from the printer 4A on the fourth conveyance path 17B, if another of the platens 50 is detected by the proximity sensor 73, the CPU 101 may stop the driving of the longitudinal belt motor 131, may stop the conveyance of the platen 50 by the longitudinal belts 81A, and may cause the other platen 50 to stand by at a position of the proximity sensor 73 on the third conveyance path 14H. In a similar manner, when one of the platens 50 is conveyed from the printer 3A or from the printer 5A on the second conveyance path 15B or the sixth conveyance path 19B, if another of the platens 50 is detected by the proximity sensor 71 or the proximity sensor 75, the CPU 101 may stop the driving of the longitudinal belt motor 131, may stop the conveyance of the platen 50 by the longitudinal belts 81A, and may cause the other platen 50 to stand by at a position of the proximity sensor 71 on the first conveyance path 14G, or at a position of the proximity sensor 75 on the fifth conveyance path 14I.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A conveyance control device comprising:
a processor configured to control a conveyer, the conveyer configured to convey a platen from a conveyance start position of the platen to one of a plurality of printers via a pretreatment device configured to perform pretreatment on a recording medium placed on the platen, the plurality of printers including a plurality of first printers and a plurality of second printers, the conveyer configured to convey the platen to one of a first lane including the plurality of first printers or a second lane including the plurality of second printers, the first lane including a plurality of first branch conveyers branching from the first lane, the second lane including a plurality of second branch conveyers branching from the second lane, each of the plurality of first printers being connected to a corresponding one of the plurality of first branch conveyers, each of the plurality of second printers being connected to a corresponding one of the plurality of second branch conveyers; and a memory storing computer-readable instructions that, when executed by the processor, instruct the processor to perform a process comprising:

performing determination processing of determining to which of the plurality of printers the platen is to be conveyed, the determination processing including determining whether to convey the platen to the first lane or to convey the platen to the second lane, based on the recording medium placed on the platen.

2. The conveyance control device according to claim 1, wherein the computer-readable instructions stored in the memory further instruct the processor to perform a process comprising:

in the determination processing, determining to which of the lanes the platen is to be conveyed during a period of the platen moving from the conveyance start position to a branch point between the first lane and the second lane.

3. The conveyance control device according to claim 1, wherein the computer-readable instructions stored in the memory further instruct the processor to perform a process comprising:

in the determination processing, determining to which of the printers of the plurality of first printers the platen is to be conveyed, or to which of the printers of the plurality of second printers the platen is to be conveyed, based on states of the plurality of printers.

4. The conveyance control device according to claim 1, wherein the computer-readable instructions stored in the memory further instruct the processor to perform a process comprising:

in the determination processing, determining to which of the printers, of the plurality of first printers and the plurality of second printers, the platen is to be conveyed, after the platen moves from the conveyance start position to a branch point between the first lane and the second lane.

5. The conveyance control device according to claim 1, wherein the pretreatment device is provided in each of the first lane and the second lane, and the computer-readable instructions stored in the memory further instruct the processor to perform a process comprising:

in the determination processing, determining whether to convey the platen to the first lane or convey the platen to the second lane, based on a state of each the pretreatment devices.

6. The conveyance control device according to claim 1, wherein the computer-readable instructions stored in the memory further instruct the processor to perform a process comprising:

in the determination processing, determining to which of the printers the platen is to be conveyed for each of the platens being conveyed.

7. A conveyance control method in which a computer controls a conveyer, the conveyer configured to convey a platen from a conveyance start position of the platen to one of a plurality of printers via a pretreatment device configured to perform pretreatment on a recording medium placed on the platen, the plurality of printers including a plurality of first printers and a plurality of second printers, the conveyer configured to convey the platen to one of a first lane including the plurality of first printers or a second lane including the plurality of second printers, the first lane including a plurality of first branch conveyers branching from the first lane, the second lane including a plurality of second branch conveyers branching from the second lane, each of the plurality of first printers being connected to a corresponding one of the plurality of first branch conveyers, each of the plurality of second printers being connected to a corresponding one of the plurality of second branch conveyers, the conveyance control method comprising:

performing determination processing of determining whether to convey the platen to the first lane or to convey the platen to the second lane, based on the recording medium placed on the platen.

8. A non-transitory computer-readable medium storing computer-readable instructions that, when executed by a computer configured to control a conveyer causes the computer to perform a process, the conveyer configured to convey a platen from a conveyance start position of the platen to one of a plurality of printers via a pretreatment device performing pretreatment on a recording medium placed on the platen, the plurality of printers including a plurality of first printers and a plurality of second printers, the conveyer configured to convey the platen to one of a first lane including the plurality of first printers or a second lane including the plurality of second printers, the first lane including a plurality of first branch conveyers branching from the first lane, the second lane including a plurality of second branch conveyers branching from the second lane, each of the plurality of first printers being connected to a corresponding one of the plurality of first branch conveyers, each of the plurality of second printers being connected to a corresponding one of the plurality of second branch conveyers, and the process comprising:

performing determination processing of determining whether to convey the platen to the first lane or to convey the platen to the second lane, based on the recording medium placed on the platen.

* * * * *